US012562504B2

(12) United States Patent
Wu

(10) Patent No.: US 12,562,504 B2
(45) Date of Patent: Feb. 24, 2026

(54) ANTENNA SYSTEM AND ELECTRONIC DEVICE

(71) Applicant: Nokia Technologies Oy, Espoo (FI)

(72) Inventor: Xiaopu Wu, Dongguan (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 235 days.

(21) Appl. No.: 18/340,284

(22) Filed: Jun. 23, 2023

(65) Prior Publication Data

US 2023/0352852 A1 Nov. 2, 2023

Related U.S. Application Data

(63) Continuation of application No. PCT/CN2021/131236, filed on Nov. 17, 2021.

(30) Foreign Application Priority Data

Dec. 29, 2020 (CN) ......................... 202011608740.5

(51) Int. Cl.
*H01Q 1/00* (2006.01)
*H01Q 1/24* (2006.01)
*H01Q 21/28* (2006.01)

(52) U.S. Cl.
CPC ............. *H01Q 21/28* (2013.01); *H01Q 1/243* (2013.01)

(58) Field of Classification Search
CPC ........ H01Q 1/241; H01Q 21/28; H01Q 21/30; H01Q 5/30; H01Q 1/22; H01Q 1/243;
(Continued)

(56) References Cited

U.S. PATENT DOCUMENTS

2019/0252764 A1 8/2019 Liao et al.
2021/0297103 A1* 9/2021 Kang ..................... H01Q 21/28
2022/0038160 A1* 2/2022 Bremer ................ H04B 7/0686

FOREIGN PATENT DOCUMENTS

CN 106571538 4/2017
CN 108206331 6/2018
(Continued)

OTHER PUBLICATIONS

IP.com search history (Year: 2025).*
(Continued)

*Primary Examiner* — Moustapha Diaby
(74) *Attorney, Agent, or Firm* — ALSTON & BIRD LLP

(57) ABSTRACT

An antenna system includes multiple antenna modules. Each antenna module includes a first lower band (LB) antenna element, a second LB antenna element, a third LB antenna element, and a fourth LB antenna element. The first LB antenna element, the second LB antenna element, the third LB antenna element, and the fourth LB antenna element are all configure to support at least one of a long term evolution (LTE)-LB (LTE-LB) and a new radio (NR)-LB (NR-LB). The first controller is configured to control at least one of the first LB antenna element, the second LB antenna element, the third LB antenna element, or the fourth LB antenna element to support the LTE-LB, and at least one other among the first LB antenna element, the second LB antenna element, the third LB antenna element, and the fourth LB antenna element unit to support the NR-LB.

20 Claims, 14 Drawing Sheets

(58) Field of Classification Search
CPC .. H01Q 1/36; H01Q 1/48; H01Q 1/50; H01Q 1/523; Y02D 30/70
USPC ....................................................... 455/575.7
See application file for complete search history.

(56) References Cited

FOREIGN PATENT DOCUMENTS

| | | |
|---|---|---|
| CN | 108417988 | 8/2018 |
| CN | 109286076 | 1/2019 |
| CN | 110994156 | 4/2020 |
| CN | 111149257 | 5/2020 |
| CN | 111294081 | 6/2020 |
| CN | 109687105 | 10/2020 |
| CN | 111800160 | 10/2020 |
| CN | 211829200 | 10/2020 |
| CN | 112086753 | 12/2020 |
| CN | 112114202 | 12/2020 |
| CN | 112751212 A | 5/2021 |
| TW | I642235 | 11/2018 |
| WO | 2019132501 | 7/2019 |

OTHER PUBLICATIONS

Guan et al., "A novel miniaturized full netcom antenna for mobile terminal," Chinese Journal of Radio Science, Jun. 2016, vol. 31, No. 3.
Sim et al., "Wideband MIMO Antenna Array Design for Future Mobile Devices Operating in the 5G NR Frequency Bands n77/n78/n79 and LTE Band 46," IEEE Antennas and Wireless Propagation Letters, 2020, vol. 19, No. 1.
Dong et al., "Research on Solution to Terminal Implementation for 5G NR Networking Mode," Mobile Communications, 2017, vol. 41, No. 19.
CNIPA, Notification to Grant Patent Right for Invention for CN Application No. 202011608740.5, Jun. 29, 2023.
CNIPA, First Office Action for CN Application No. 202011608740.5, Oct. 8, 2022.
CNIPA, Second Office Action for CN Application No. 202011608740.5, Apr. 28, 2023.
Ding et al., "A compact 16-port multi-band MIMO antenna array for 5G smart phones," Journal of Terahertz Science and Electronic Information Technology, Dec. 2019, vol. 17, No. 6.
You et al., "Advanced 12x12 MIMO Antennas for Next Generation 5G Smartphones," 2019 IEEE International Symposium on Antennas and Propagation and USNC-URSI Radio Science Meeting, Oct. 2019.
WIPO, International Search Report and Written Opinion for International Application No. PCT/CN2021/131236, Feb. 10, 2022.
EPO, Extended European Search Report for EP Application No. 21913567.0, May 31, 2024.

* cited by examiner

ANTENNA SYSTEM AND ELECTRONIC DEVICE

CROSS-REFERENCE TO RELATED APPLICATION(S)

This application is a continuation of International Application No. PCT/CN2021/131236, filed Nov. 17, 2021, which claims priority to Chinese Patent Application No. 202011608740.5, filed Dec. 29, 2020, the entire disclosures of which are incorporated herein by reference.

TECHNICAL FIELD

This disclosure relates to the field of communication technology, and more particularly to an antenna system and an electronic device.

BACKGROUND

With the development of technology, electronic devices with communication functions, such as mobile phones, are increasingly popular, and functions of the electronic devices are increasingly powerful. Generally, an electronic device includes an antenna system to implement a communication function of the electronic device. How to improve communication quality of the electronic device and promote miniaturization of the electronic device becomes a technical problem to-be-solved.

SUMMARY

An antenna system and an electronic device are provided in the disclosure.

In a first aspect, an antenna system is provided in implementations of the disclosure. The antenna system includes multiple antenna modules and a first controller. The multiple antenna modules include a first antenna module, a second antenna module, a third antenna module, and a fourth antenna module. The first antenna module includes a first lower band (LB) antenna element. The second antenna module includes a second LB antenna element. The third antenna module includes a third LB antenna element. The fourth antenna module includes a fourth LB antenna element. Each of the first LB antenna element, the second LB antenna element, the third LB antenna element, and the fourth LB antenna element is configured to support at least one of a long term evolution-LB (LTE-LB) or a new radio-LB (NR-LB). The LTE-LB ranges from 0 to 1000 megahertz (MHz), and the NR-LB ranges from 0 to 1000 MHz. The first controller is configured to control at least one of the first LB antenna element, the second LB antenna element, the third LB antenna element, or the fourth LB antenna element to support the LTE-LB and control at least one of the others among the first LB antenna element, the second LB antenna element, the third LB antenna element, and the fourth LB antenna element to support the NR-LB, to realize LTE-NR double connect (EN-DC) in an LB.

In a second aspect, an electronic device is provided in implementations of the disclosure. The electronic device includes a housing and an antenna system, where the antenna system is at least partially integrated at the housing or is received in the housing. The antenna system includes multiple antenna modules and a first controller. The multiple antenna modules include a first antenna module, a second antenna module, a third antenna module, and a fourth antenna module. The first antenna module includes a first lower band (LB) antenna element. The second antenna module includes a second LB antenna element. The third antenna module includes a third LB antenna element. The fourth antenna module includes a fourth LB antenna element. Each of the first LB antenna element, the second LB antenna element, the third LB antenna element, and the fourth LB antenna element is configured to support at least one of a long term evolution-LB (LTE-LB) or a new radio-LB (NR-LB). The LTE-LB ranges from 0 to 1000 megahertz (MHz), and the NR-LB ranges from 0 to 1000 MHz. The first controller is configured to control at least one of the first LB antenna element, the second LB antenna element, the third LB antenna element, or the fourth LB antenna element to support the LTE-LB and control at least one of the others among the first LB antenna element, the second LB antenna element, the third LB antenna element, and the fourth LB antenna element to support the NR-LB, to realize LTE-NR double connect (EN-DC) in an LB.

BRIEF DESCRIPTION OF THE DRAWINGS

In order to describe technical solutions in implementations of the disclosure more clearly, the following will give a brief introduction to accompanying drawings required for describing implementations. Apparently, the accompanying drawings hereinafter described merely illustrate some implementations of the disclosure. Based on these drawings, those of ordinary skills in the art can also obtain other drawings without creative effort.

DETAILED DESCRIPTION

The following will illustrate clearly and completely technical solutions of implementations of the disclosure with reference to accompanying drawings of implementations of the disclosure. Apparently, implementations illustrated herein are merely some, rather than all implementations, of the disclosure. The implementations listed herein can be combined with each other appropriately.

Since functions and the number of internal components of electronic devices such as mobile phones are increasing, and users have a strict requirement on an overall size and a weight of the mobile phone, an internal space of the mobile phone is extremely limited. In the extremely limited space of the mobile phone, it is necessary to arrange a $4^{th}$ generation (4G) lower band (LB) antenna, a $5^{th}$ generation (5G) LB antenna, a 4G high band (HB) antenna, a 5G HB antenna, a global positioning system (GPS) antenna, a wireless fidelity (Wi-Fi) antenna, etc. For some types of antennas, the number of antennas may be multiple. As a result, the space in the mobile phone becomes extremely limited. However, due to a relatively large size of an LB antenna, the number of LB antennas in the mobile phone needs to be strictly controlled to avoid arrangement of a relatively large number of LB antennas, thereby avoiding a case where there is no sufficient space for other antennas. Therefore, for those skilled in the art, to balance arrangement of HB antennas, GPS antennas, and Wi-Fi antennas, the space reserved for LB antennas is relatively small, which leads to a small number of LB antennas that can be arranged in the mobile phone, and thus it is unable to cover more LBs. The space for arranging antennas on or near frames of the mobile phone has been used to the extreme, and with the development and use of more LBs, the mobile phone cannot support more LBs. If the space for other antennas is occupied, it may inevitably lead to poor signal quality in other bands, which may also lead to poor experience of the mobile phone. Therefore, how to achieve coverage of more LBs when the mobile phone has a limited space and ensure that the 4G HB antenna, the 5G HB antenna, the GPS antenna, the Wi-Fi antenna, and the like are not affected or signals are even stronger, has become a technical problem to-be-solved.

Based on this, an antenna system and an electronic device with the antenna system are provided in implementations of the disclosure, which can cover more LBs when a mobile phone has a limited space and ensure that 4G HB signals, 5G HB signals, GPS signals, Wi-Fi signals, and the like are not affected or even are stronger.

Figure 1:
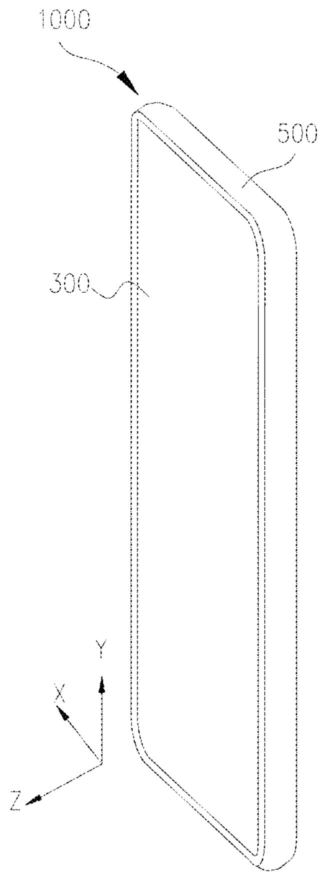
FIG. 1 is a schematic structural view of an electronic device provided in implementations of the disclosure.

Referring to FIG. 1, FIG. 1 is a schematic structural diagram of an electronic device 1000 according to implementations of the disclosure. The electronic device 1000 may be a device capable of transmitting/receiving (i.e., transmitting and/or receiving) electromagnetic wave signals, such as a telephone, a television, a tablet computer, a mobile phone, a camera, a personal computer, a notebook computer, a vehicle-mounted device, an earphone, a watch, a wearable device, a base station, a vehicle-mounted radar, and a customer premise equipment (CPE). Taking that the electronic device 1000 is a mobile phone as an example, for ease of illustration, the electronic device 1000 is described by taking the electronic device 1000 at a first view angle as a reference, a width direction of the electronic device 1000 is defined as an X direction, a length direction of the electronic device 1000 is defined as a Y direction, and a thickness direction of the electronic device 1000 is defined as a Z direction. A direction indicated by an arrow is a forward direction.

Figure 2:
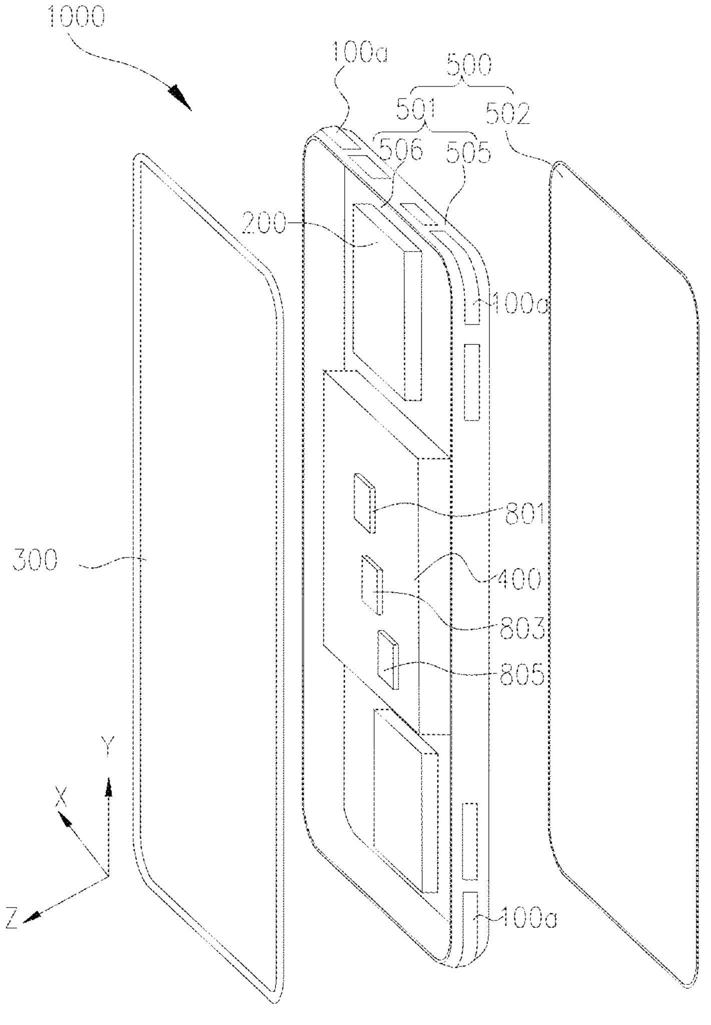
FIG. 2 is a schematic structural exploded view of the electronic device provided in FIG. 1.

Referring to FIG. 2, the electronic device 1000 includes a display screen 300 and a housing 500 that fits with the display screen 300. The housing 500 includes a middle frame 501 and a rear cover 502 that fits with the middle frame 501. The rear cover 502 is located at a side of the middle frame 501 away from the display screen 300. The middle frame 501 includes a middle plate 506 and a frame 505 that surrounds and is connected to a periphery of the middle plate 506. The middle plate 506 is configured to carry an electronic component(s) such as a main printed circuit board 200 and a battery 400. An edge of the display screen 300, the frame 505, and the rear cover 502 are connected in sequence. The frame 505 and the rear cover 502 can be integrally formed. Certainly, in other implementations, the electronic device 1000 may not include the display screen 300.

Figure 3:
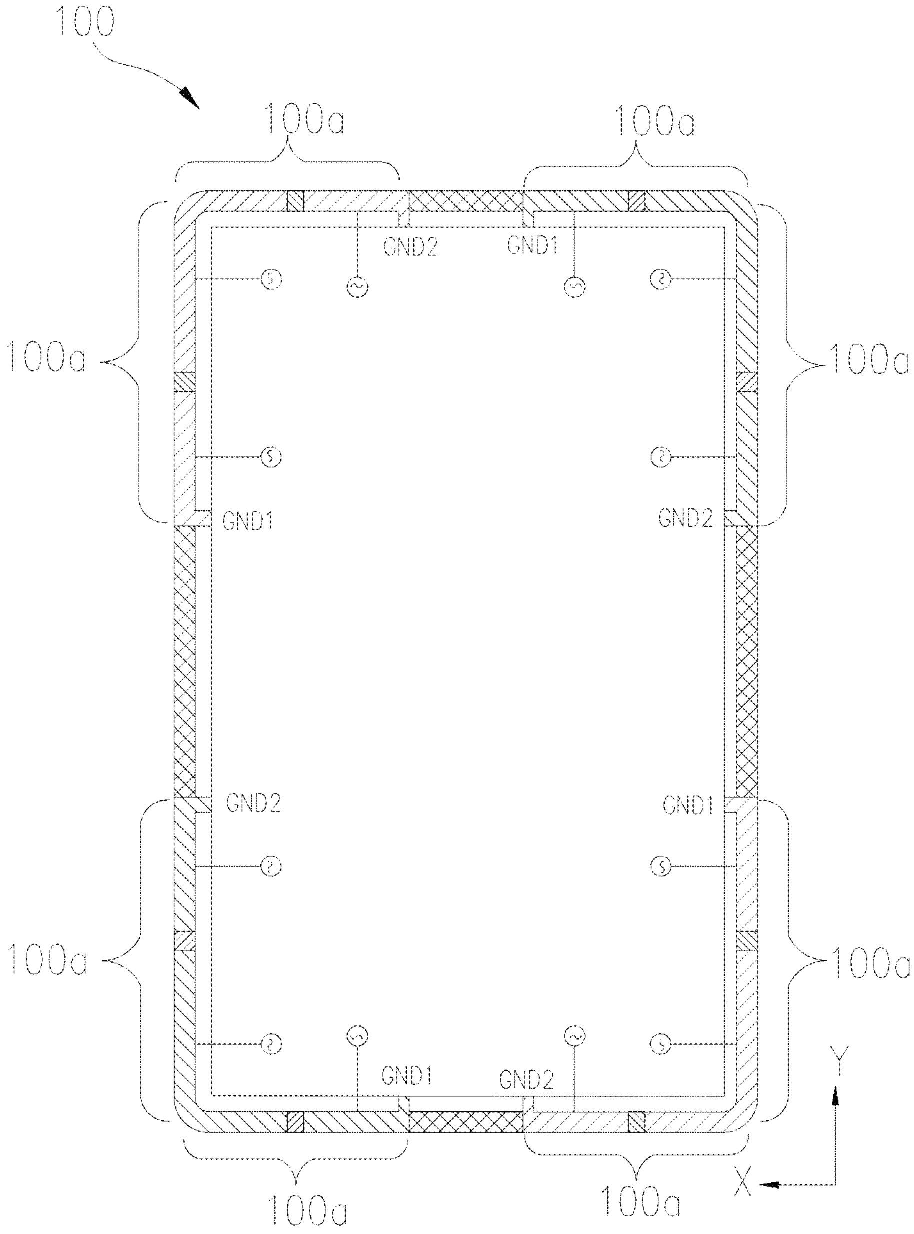
FIG. 3 is a schematic structural view of a first type of antenna system provided in implementations of the disclosure.

Referring to FIGS. 2 and 3, the electronic device 1000 further includes an antenna system 100. The antenna system 100 is at least partially integrated at the housing 500 or entirely arranged in the housing 500. In some implementations, at least part of the antenna system 100 is arranged on the main printed circuit board 200 of the electronic device 1000 or electrically connected to the main printed circuit board 200 of the electronic device 1000. The antenna system 100 is configured to transmit/receive (i.e., transmit and/or receive) an electromagnetic wave signal(s) to realize a communication function of the electronic device 1000.

Referring to FIGS. 2 and 3, the antenna system 100 includes multiple antenna modules **100*a*. Each antenna module 100***a* is a separate and complete antenna transceiving module. The number and structure of the antenna modules 100*a* are not limited in the disclosure. The antenna modules 100*a* can transmit/receive at least one of a 4G LB, a 4G middle high band (NMB), a 4G ultra high band (UHB), a 5G LB, a 5G MHB, a 5G UHB, a GPS band, a WiFi-2.4G band, a WiFi-5G band, or the like.

Figure 4:
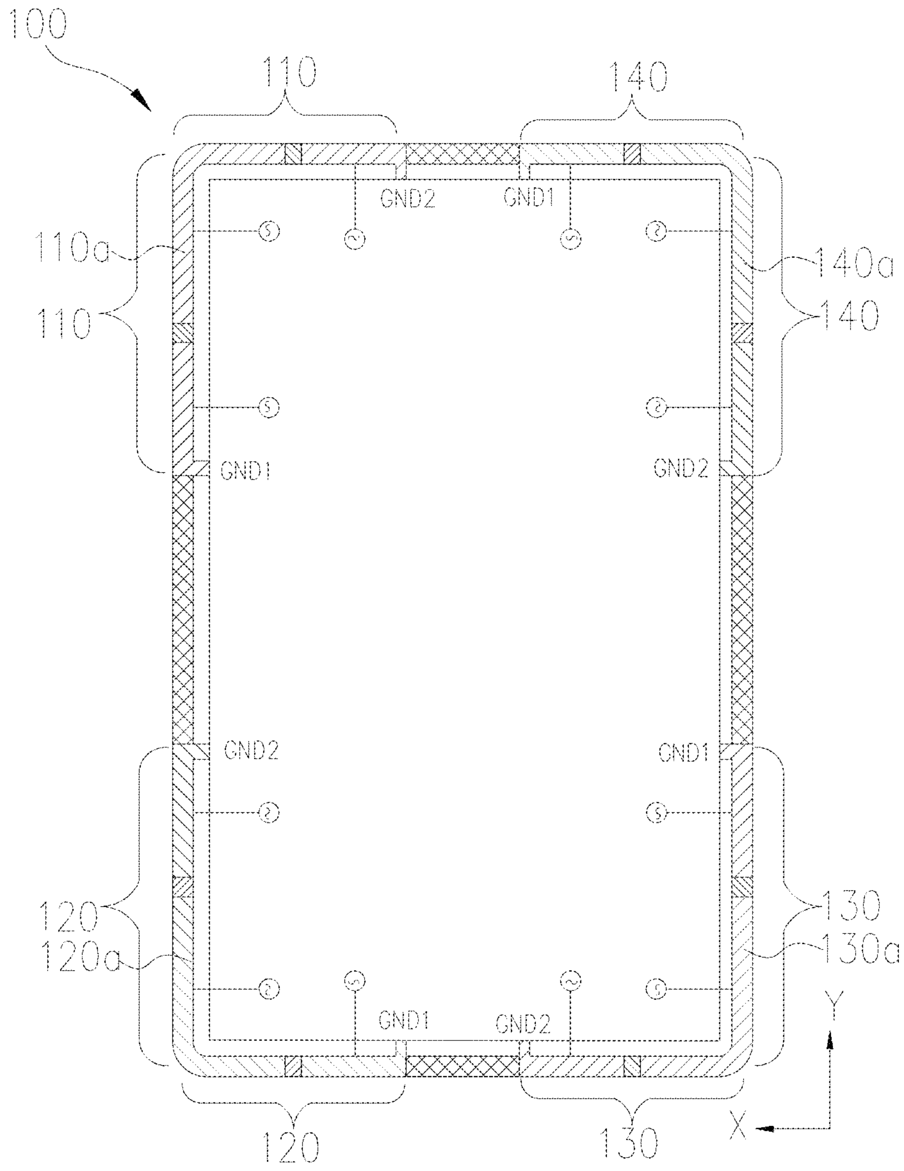
FIG. 4 is a schematic structural view of a first type of antenna system provided in implementations of the disclosure.
Figure 5:
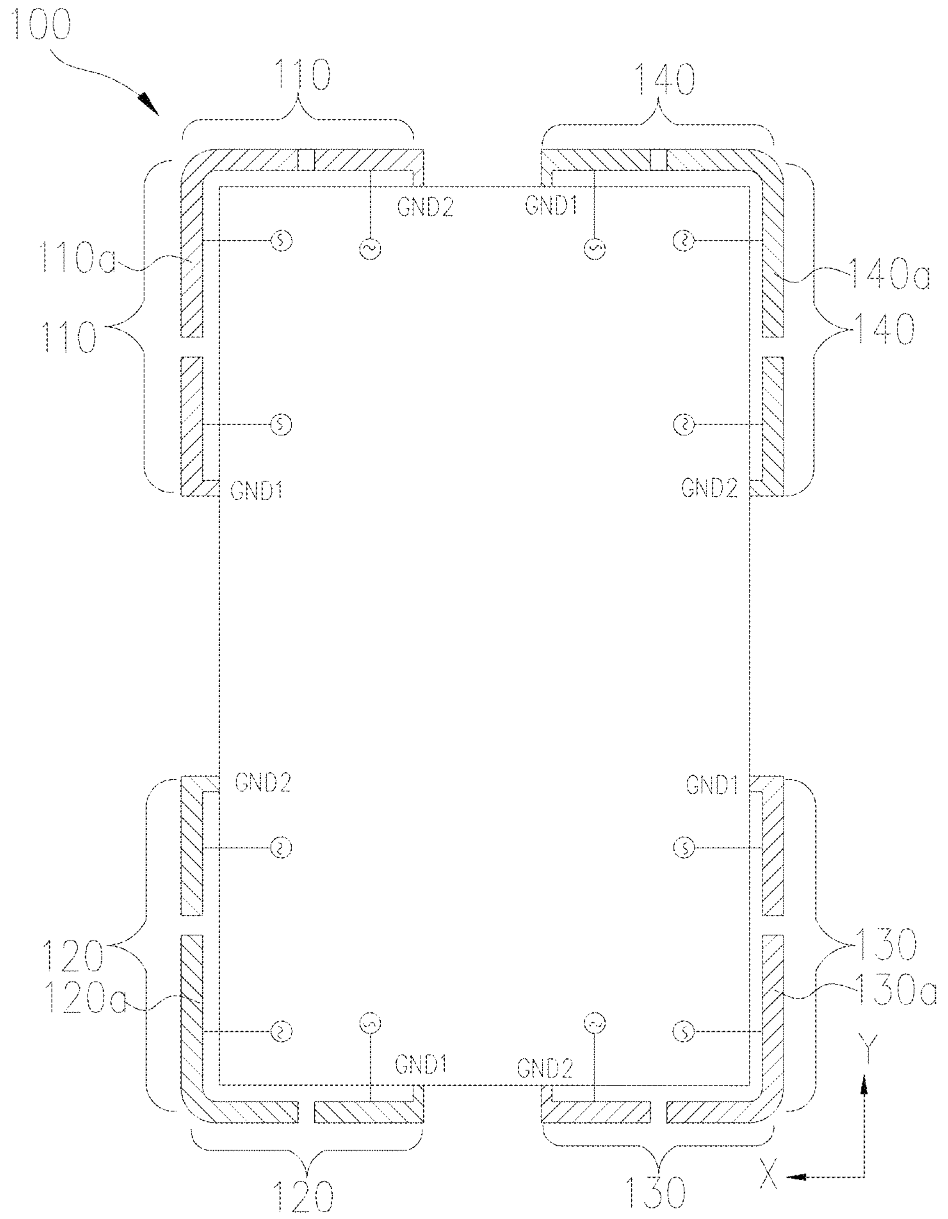
FIG. 5 is a schematic structural view of the antenna system provided in FIG. 4.

In the implementation, referring to FIGS. 4 and 5, the multiple antenna modules 100*a* include at least a first antenna module 110, a second antenna module 120, a third antenna module 130, and a fourth antenna module 140. It needs to be noted that, for example, there are merely four antenna modules 100*a* in the disclosure. Five antenna modules 100*a*, six antenna modules 100*a*, or other numbers of antenna modules 100*a* can be set by those skilled in the art according to the concept of the disclosure. In other words, the multiple antenna modules 100*a* can further include a fifth antenna module, a sixth antenna module, etc.

The first antenna module 110 includes a first LB antenna element 110*a* configured to transmit/receive an electromagnetic wave signal(s) of a first band.

The second antenna module 120 includes a second LB antenna element 120*a* configured to transmit/receive an electromagnetic wave signal(s) of a second band.

The third antenna module 130 includes a third LB antenna element 130*a* configured to transmit/receive an electromagnetic wave signal(s) of a third band.

The fourth antenna module 140 includes a fourth LB antenna element 140*a* configured to transmit/receive an electromagnetic wave signal(s) of a fourth band. The first band, the second band, the third band, and the fourth band each range from 0 to 1000 megahertz (MHz). A band less than 1000 MHz is an LB. In other words, the first band, the second band, the third band, and the fourth band each are an LB.

The first band, the second band, the third band, and the fourth band are not specifically limited in the disclosure. Optionally, the first band, the second band, the third band, and the fourth band may all be the same band. Alternatively, some of the first band, the second band, the third band, and the fourth band may be the same or different. Alternatively, the first band, the second band, the third band, and the fourth band are different from each other.

Each of the first LB antenna element 110*a*, the second LB antenna element 120*a*, the third LB antenna element 130*a*, and the fourth LB antenna element 140*a* is configured to support at least one of a long term evolution-LB (LTE-LB) or a new radio-LB (NR-LB), that is, support the LTE-LB, the NR-LB, or both the LTE-LB and the NR-LB. That is, at least one of the first LB antenna element 110*a*, the second LB antenna element 120*a*, the third LB antenna element 130*a*, or the fourth LB antenna element 140*a* is configured to support any one of the LTE-LB and the NR-LB, or at least one of the first LB antenna element 110*a*, the second LB antenna element 120*a*, the third LB antenna element 130*a*, or the fourth LB antenna element 140*a* is configured to support both the LTE-LB and the NR-LB. The LTE-LB ranges from 0 to 1000 MHz. In the disclosure, LTE may also be represented as 4G LTE. The NR-LB ranges from 0 to 1000 MHz. In the disclosure, NR may also be represented as 5G NR or 5G.

In an implementation, one of the first LB antenna element 110*a*, the second LB antenna element 120*a*, the third LB antenna element 130*a*, and the fourth LB antenna element 140*a* is configured to support any one of the LTE-LB and the NR-LB, and the other three among the first LB antenna element 110*a*, the second LB antenna element 120*a*, the third LB antenna element 130*a*, and the fourth LB antenna element 140*a* is configured to support the LTE-LB or the NR-LB. In other words, a band transmitted/received by one of the four LB antenna elements can be switched between an LTE network and an NR network, and a band transmitted/received by each of the other three LB antenna elements in the four LB antenna elements is a band of a fixed network. For example, a band transmitted/received by each of the other three of the four LB antenna elements is a band of an LTE network. Alternatively, a band transmitted/received by one of the three LB antenna elements is a band of an LTE network, and a band transmitted/received by each of the other two of the three LB antenna elements is a band of an NR network. Alternatively, a band transmitted/received by one of the three LB antenna elements is a band of an NR network, and a band transmitted/received by each of the other two of the three LB antenna elements is a band of an LTE network. Alternatively, a band transmitted by each of the three LB antenna elements is a band of an NR network.

In another implementation, two, three, or four of the first LB antenna element 110*a*, the second LB antenna element 120*a*, the third LB antenna element 130*a*, and the fourth LB antenna element 140*a* are configured to support at least one of the LTE-LB or the NR-LB.

In the implementation, the first LB antenna element 110*a*, the second LB antenna element 120*a*, the third LB antenna element 130*a*, and the fourth LB antenna element 140*a* each is configured to support any one of the LTE-LB and the NR-LB. Optionally, an implementation in which the first LB antenna element 110*a* can support any one of the LTE-LB and the NR-LB includes, but is not limited to, the following. The first LB antenna element 110*a* can be switched, through a switch, to be electrically connected to an LTE radio frequency (RF) transceiving module or an NR RF transceiving module, thus enabling the first LB antenna element 110*a* to support any one of the LTE-LB and the NR-LB. For the structures of other LB antenna elements, reference can be made to the above implementations, and examples are not exhaustlessly illustrated here.

The antenna system 100 further includes a first controller 801. The first controller 801 is configured to control at least one of the first LB antenna element 110*a*, the second LB antenna element 120*a*, the third LB antenna element 130*a*, or the fourth LB antenna element 140*a* to support the LTE-LB, and control at least one of the others among the first LB antenna element 110*a*, the second LB antenna element 120*a*, the third LB antenna element 130*a*, and the fourth LB antenna element 140*a* to support the NR-LB, to achieve LTE-NR double connect (EN-DC) in an LB. In one implementation, the first controller 801 is configured to control any two of the first LB antenna element 110*a*, the second LB antenna element 120*a*, the third LB antenna element 130*a*, and the fourth LB antenna element 140*a* to support the LTE-LB, and control the other two of the first LB antenna element 110*a*, the second LB antenna element 120*a*, the third LB antenna element 130*a*, and the fourth LB antenna element 140*a* to support the NR-LB, and thus for the antenna system 100, EN-DC in the LB can be achieved. The EN-DC refers to a dual connection between a 4G radio access network and a 5G-NR.

The LTE-LB includes at least one of a B20 band or a B28 band, and the NR-LB includes at least one of an N28 band, an N8 band, or an N5 band. For example, the LTE-LB is the B28 band, and the NR-LB is the N5 band. In this way, the antenna system can support both the B28 band and the N5 band.

With the above configuration, the electronic device 1000 can support both 4G mobile communication signals and 5G mobile communication signals of an LB, realizing ultra-wideband carrier aggregation (CA) and the dual connection between the 4G radio access network and the 5G-NR (EN-DC).

In traditional technology, an electronic device such as a mobile phone has a limited space, and a space reserved for LB antennas in a certain space is limited. Therefore, the number of LB antennas is limited, and LBs supported by the mobile phone are limited when the number of LB antennas is limited. For example, three LB antennas are arranged in the extreme space inside the mobile phone, other spaces for antenna arrangement are occupied by other antennas, and the three LB antennas can only support a K1 band and a K2 band in the LB, where two LB antennas support the K1 band. Since a bandwidth of the K2 band is relatively small (e.g., less than 60 MHz), one LB antenna can be used to support the K2 band. However, since a bandwidth supported by one LB antenna is less than 100 MHz, a single LB antenna cannot support a K3 band (e.g., bandwidth greater than 100 MHz) and a K4 band (e.g., bandwidth greater than 100 MHz). With development of the LB, the K3 band and K4 band are also put into use, but the existing mobile phone cannot support the K3 band and K4 band each having a relatively wide bandwidth.

The antenna system 100 provided in the implementations of the disclosure includes at least four LB antenna elements, where at least one of the LB antenna elements is configured to support any of the LTE-LB and the NR-LB, and the first controller 801 is configured to control at least one of the LB antenna elements to support the LTE-LB, and control at least one of the others among the LB antenna elements to support the NR-LB, to achieve EN-DC in the LB. By setting at least four LB antenna elements to support two bands each having a relatively wide bandwidth, the antenna system 100 can support an LB with a relatively wide bandwidth, and thus the antenna system can have a relatively broad application in the LB. When the antenna system 100 is applied to the electronic device 1000, since the antenna module **100*a* is reduced in size while covering a relatively wide band, more antenna spaces can be saved to arrange a relatively large number of LB antenna elements. In this way, a relatively large number of LB antenna elements can be arranged in the limited space of the electronic device 1000, which can improve a coverage of the LB by the electronic device, thereby enhancing the communication quality of the electronic device 1000, facilitating the overall miniaturization of the electronic device 1000, and expanding the application scope of the electronic device 1000**.

The antenna module **100*a* of the disclosure is designed to enable that radiators can be multiplexed with each other through coupling between the radiators, and thus a radiator of each antenna module 100*a*** can be reduced in size as much as possible while ensuring transmission/reception of LB signals and HB signals, thereby saving some spaces on or inside the housing for antenna arrangement, and allowing a relatively large number of LB antennas to be arranged.

Figure 6:
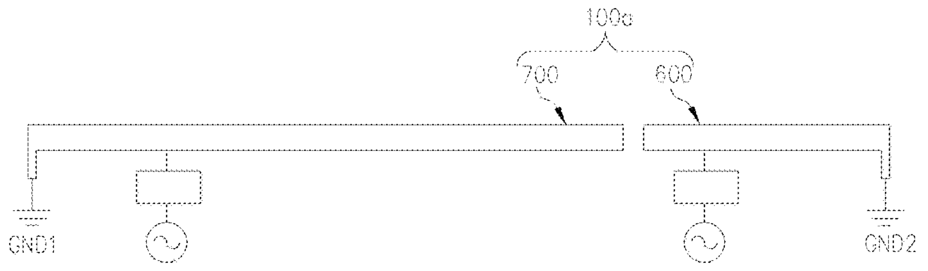
FIG. 6 is a schematic structural view of a first type of antenna module provided in implementations of the disclosure.
Figure 7:
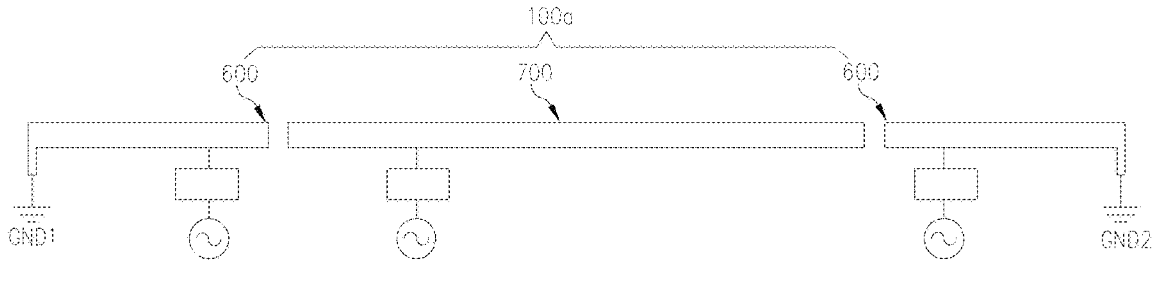
FIG. 7 is a schematic structural view of a second type of antenna module provided in implementations of the disclosure.

Referring to FIGS. 6 and 7, in some implementations, at least one of the first antenna module 110, the second antenna module 120, the third antenna module 130, or the fourth antenna module 140 further includes at least one MHB+UHB antenna element 600. The MHB+UHB antenna element 600 is configured to transmit/receive an electromagnetic wave signal of a frequency greater than 1000 MHz. Optionally, the MHB+UHB antenna element 600 can be configured to support an LTE MHB+UHB. Optionally, the MHB+UHB antenna element 600 can be configured to support an NR MHB+UHB. Further optionally, the MHB+UHB antenna element 600 can be configured to support any of the LTE MHB+UHB and the NR MHB+UHB through switching the MHB+UHB antenna element 60 to be electrically connected to an LTE MHB+UHB transceiving chip or an NR MHB+UHB transceiving chip. Further, the MHB+UHB antenna element 600 is configured to transmit/receive a band ranging from 1000 MHz to 10000 MHz. One antenna module **100*a* with the LB antenna element and the MHB+UHB antenna element 600** can cover electromagnetic wave signals of all LBs, all MHBs, and all UHBs of 4G and 5G, including LTE-1/2/3/4/7/32/40/41, NR-1/3/7/40/41/77/78/79, Wi-Fi 2.4G, Wi-Fi 5G, GPS-L1, GPS-L5, etc., to achieve ultra-wideband CA and the dual connection between the 4G radio access network and the 5G-NR (EN-DC).

The specific cases in which the four antenna modules **100*a* include the LB antenna element 700 and the MHB+UHB antenna element 600 include but are not limited to the following implementations. In the first implementation, one of the four antenna modules 100*a* includes the LB antenna element 700 and at least one MHB+UHB antenna element 600, and the other three of the four antenna modules 100*a* each include the LB antenna element 700. In the second implementation, two of the four antenna modules 100*a* each include the LB antenna element 700 and at least one MHB+UHB antenna element 600, and the other two of the four antenna modules 100*a* each include the LB antenna element 700. In the third implementation, three of the four antenna modules 100*a* each include the LB antenna element 700 and at least one MHB+UHB antenna element 600, and the other one of the four antenna modules 100*a* includes the LB antenna element 700. In the fourth implementation, the four antenna modules 100*a* each include the LB antenna element 700 and at least one MHB+UHB antenna element 600**.

A radiator of the MHB+UHB antenna element 600 is in capacitive coupling with a radiator of the LB antenna element 700, and at least part of bands transmitted/received by the MHB+UHB antenna element 600 are formed by the capacitive coupling. In the disclosure, the LB antenna element 700 is at least one of the first LB antenna element **110*a*, the second LB antenna element 120*a*, the third LB antenna element 130*a*, or the fourth LB antenna element 140*a*, which will not be further described. For example, when the first antenna module 110 includes the first LB antenna element 110*a* and at least one MHB+UHB antenna element 600, the radiator of the MHB+UHB antenna element 600 is in capacitive coupling with the radiator of the first LB antenna element 110*a***.

By means of that at least one antenna module **100*a* includes the LB antenna element 700 and the MHB+UHB antenna element 600 that are in capacitive coupling, the radiator of the LB antenna element 700 is in capacitive coupling with the radiator of the MHB+UHB antenna element 600, and thus multiplexing between the radiator of the LB antenna element 700 and the radiator of the MHB+UHB antenna element 600 can be realized. Compared with the LB antenna element 700 and the MHB+UHB antenna element 600 that are in a non-coupled state, in the disclosure the size of the radiator of the antenna module 100*a* can be effectively reduced. In this way, the antenna module 100*a* with a reduced size can cover the LB, the MHB, and the UHB, thus saving more spaces to accommodate more LB antenna elements 700. As a result, at least four LB antenna elements 700 can be accommodated in the limited space of the electronic device 1000 to support signals of more LBs, improving the communication quality of the electronic device 1000 without increase of the overall volume of the electronic device 1000**.

In the disclosure, there is no specific limitation on bands transmitted/received by the first LB antenna element 110*a*, the second LB antenna element 120*a*, the third LB antenna element 130*a*, and the fourth LB antenna element 140*a*. The following implementations are taken as examples for illustration, but the disclosure includes, but is not limited to, the following implementations.

In one implementation, a combined bandwidth of the bands supported by the first LB antenna element 110*a*, the second LB antenna element 120*a*, the third LB antenna element 130*a*, and the fourth LB antenna element 140*a* is greater than or equal to 350 MHz. Optionally, each of the first LB antenna element 110*a*, the second LB antenna element 120*a*, the third LB antenna element 130*a*, and the fourth LB antenna element 140*a* supports a bandwidth ranging from 80 MHz to 100 MHz. By adjusting the bands supported by the first LB antenna element 110*a*, the second LB antenna element 120*a*, the third LB antenna element 130*a*, and the fourth LB antenna element 140*a* to enable that there is no overlap or a relatively small overlap between the bands supported by the first LB antenna element 110*a*, the second LB antenna element 120*a*, the third LB antenna element 130*a*, and the fourth LB antenna element 140*a*, the sum of the bandwidths supported by the first LB antenna element 110*a*, the second LB antenna element 120*a*, the third LB antenna element 130*a*, and the fourth LB antenna element 140*a* can be enabled to be greater than or equal to 350 MHz, achieving support for signals of an LB with a bandwidth of at least 350 MHz. In other optional implementations, by means of adjusting, with a frequency-tuning circuit and so on, antenna signals transmitted/received by the LB antenna element, the bands transmitted/received by the LB antenna element can be shifted, enabling that a bandwidth of the band transmitted/received by each LB antenna element in different time periods to be greater than or equal to 350 MHz, to support signals of an LB with a bandwidth of 350 MHz in a time-division manner. Thus, the combined bandwidth supported by the first LB antenna element 110*a*, the second LB antenna element 120*a*, the third LB antenna element 130*a*, and the fourth LB antenna element 140*a* can be greater than or equal to 350 MHz.

In one implementation, a combination of the bands supported by the first LB antenna element 110*a*, the second LB antenna element 120*a*, the third LB antenna element 130*a*, and the fourth LB antenna element 140*a* ranges from 617 MHz to 960 MHz. In the antenna system 100 of implementations of the disclosure, the combined bandwidth supported by the first LB antenna element 110*a*, the second LB antenna element 120*a*, the third LB antenna element 130*a*, and the fourth LB antenna element 140*a* is greater than or equal to 350 MHz, and thus the antenna system 100 can cover an application band ranging from 617 MHz to 960 MHz, enabling the electronic device 1000 to cover the band ranging from 617 MHz to 960 MHz and accordingly improving the communication performance of the electronic device 1000 in the LB.

Since the antenna system 100 can support a relatively wide bandwidth, for example, greater than 350 MHz, the antenna system 100 can support B20+N28 bands. In addition, the antenna system 100 also supports B28+N5 bands, B20+N8 bands, etc., enabling the electronic device 1000 to support band ranges planned by various operators, and accordingly improving the applicability of the electronic device 1000 to different planned bands.

In one possible implementation, two LB antenna elements 700 in the first LB antenna element 110*a*, the second LB antenna element 120*a*, the third LB antenna element 130*a*, and the fourth LB antenna element 140*a* are configured to support the LTE-LB, and the other two LB antenna elements 700 in the first LB antenna element 110*a*, the second LB antenna element 120*a*, the third LB antenna element 130*a*, and the fourth LB antenna element 140*a* are configured to support the NR-LB. Ranges of bands transmitted/received by the at least two LB antenna elements 700 that can support the LTE-LB or the NR-LB are partially overlapping or non-overlapping in the same time period.

In some implementations, when the bandwidth of the LTE-LB is relatively large or to improve the efficiency of transmitting/receiving the LTE-LB, two, three, or all of the first LB antenna element 110*a*, the second LB antenna element 120*a*, the third LB antenna element 130*a*, and the fourth LB antenna element 140*a* can be adjusted to support the LTE-LB, and two, three, or all of the first LB antenna element 110*a*, the second LB antenna element 120*a*, the third LB antenna element 130*a*, and the fourth LB antenna element 140*a* can be adjusted to support the NR-LB.

Furthermore, the first LB antenna element 110*a*, the second LB antenna element 120*a*, the third LB antenna element 130*a*, and the fourth LB antenna element 140*a* each support a bandwidth ranging from 80 MHz to 100 MHz. By adjusting the bands supported by the first LB antenna element 110*a*, the second LB antenna element 120*a*, the third LB antenna element 130*a*, and the fourth LB antenna element 140*a* to enable that there is no overlap or a relatively small overlap between the bands supported by the first LB antenna element 110*a*, the second LB antenna element 120*a*, the third LB antenna element 130*a*, and the fourth LB antenna element 140*a* in the same time period, two LB antenna elements can support the LTE-LB, and the other two LB antenna elements can support the NR-LB. In this way, both the LTE-LB and the NR-LB can be supported, and the two application bands can be supported by different LB antenna elements, thereby reducing mutual interference between the LTE-LB and the NR-LB.

Additionally, at least one of the first LB antenna element 110*a*, the second LB antenna element 120*a*, the third LB antenna element 130*a*, and the fourth LB antenna element 140*a* is equipped with a frequency-tuning circuit. The frequency-tuning circuit is configured to make the LB antenna element 700 with the frequency-tuning circuit support a band ranging from 617 MHz to 960 MHz. For example, by setting the frequency-tuning circuit in the first LB antenna element 110*a*, a resonant frequency of the first LB antenna element 110*a* can be shifted towards a relatively high band or a relatively low band, enabling a bandwidth of a band transmitted/received by the first LB antenna element 110*a* in different time periods to be greater than or equal to 350 MHz.

Moreover, for that the second LB antenna element 120*a*, the third LB antenna element 130*a*, and the fourth LB antenna element each can cover a bandwidth greater than or equal to 350 MHz in different time periods, reference can be made to the first LB antenna element 110*a*. In this way, two of the four LB antenna elements can be flexibly controlled to support the LTE-LB and the other two of the four LB antenna elements can be flexibly controlled to support the NR-LB, to adapt to different usage scenarios.

In one implementation, the first controller 801 is electrically connected to the first LB antenna element 110*a*, the second LB antenna element 120*a*, the third LB antenna element 130*a*, and the fourth LB antenna element 140*a*. The first controller 801 is configured to adjust the bands transmitted/received by the first LB antenna element 110*a*, the second LB antenna element 120*a*, the third LB antenna element 130*a*, and the fourth LB antenna element 140*a*, and adjust the first LB antenna element 110*a*, the second LB antenna element 120*a*, the third LB antenna element 130*a*, and the fourth LB antenna element 140*a* to be connected to an LTE network or an NR network.

The first LB antenna element 110*a*, the second LB antenna element 120*a*, the third LB antenna element 130*a*, and the fourth LB antenna element 140*a* can be divided into a first LB-antenna-element group and a second LB-antenna-element group, or can be divided into a third LB-antenna-element group and a fourth LB-antenna-element group. At least one LB antenna element in the first LB-antenna-element group is different from LB antenna elements in the third LB-antenna-element group. The number of LB antenna elements in each group may be two, three, or other values. In the implementation, the number of LB antenna elements in each group may be two. For example, the first LB-antenna-element group includes the first LB antenna element 110*a* and the second LB antenna element 120*a*, and the second LB-antenna-element group includes the third LB antenna element 130*a* and the fourth LB antenna element 140*a*. The third LB-antenna-element group includes the third LB antenna element 130*a* and the fourth LB antenna element 140*a*, and the fourth LB-antenna-element group includes the first LB antenna element 110*a* and the second LB antenna element 120*a*. Certainly, other combinations are also possible.

The first controller 801 is electrically connected to the first LB antenna element 110*a*, the second LB antenna element 120*a*, the third LB antenna element 130*a*, and the fourth LB antenna element 140*a*. The first controller 801 is configured to control, in a first time period, the first LB-antenna-element group to transmit/receive an electromagnetic wave signal of the LTE-LB, and control the second LB-antenna-element group to transmit/receive an electromagnetic wave signal of the NR-LB. The first controller 801 can further be configured to control, in a second time period, the third LB-antenna-element group to transmit/receive an electromagnetic wave signal of the LTE-LB and control the fourth LB-antenna-element group to transmit/receive an electromagnetic wave signal of the NR-LB.

In some implementations, in the first time period, the first LB antenna element 110*a* and the second LB antenna element 120*a* are controlled to support the LTE-LB, and the third LB antenna element 130*a* and the fourth LB antenna element 140*a* are controlled to support the NR-LB. In the second time period, the first LB antenna element 110*a* and the second LB antenna element 120*a* are controlled to support the NR-LB, and the third LB antenna element 130*a* and the fourth LB antenna element 140*a* are controlled to support the LTE-LB. When the LTE-LB is covered, the blocking condition of the antenna system 100 can be judged based on holding of the electronic device 1000, and it is flexible to select two LB antenna elements 700 to support the LTE-LB according to the blocking condition of the antenna system 100. For example, when the first LB antenna element 110*a* and the third LB antenna element 130*a* are blocked, the second LB antenna element 120*a* and the fourth LB antenna element 140*a* can be selected to support the LTE-LB. In this way, by intelligently switching the bands covered by the first LB antenna element 110*a*, the second LB antenna element 120*a*, the third LB antenna element 130*a*, and the fourth LB antenna element 140*a*, the electronic device 1000 can effectively address weak-signal issues in various holding scenarios. Furthermore, when a head of a user is close to the electronic device 1000, the LB antenna element 700 can be intelligently switched or the power of the LB antenna element 700 can be reduced, to enhance the safety of the electronic device 1000.

There is no limitation on specific LTE-LB and NR-LB in the disclosure.

Two LB antenna elements 700 can support at least a bandwidth ranging from 150 MHz to 200 MHz, so that the antenna system 100 can support both the LTE-LB and the NR-LB. A range of a bandwidth of the LTE-LB can be less than or equal to 150-200 MHz, and a range of a bandwidth of the NR-LB can be less than or equal to 150-200 MHz. In this way, the selection of the LTE-LB is broad, and the selection of the NR-LB is also extremely broad. As a result, the antenna system 100 can support many combinations of the LTE-LB and the NR-LB.

In the disclosure, there is no specific limitation on the number of the MHB+UHB antenna elements 600 in the antenna system 100. For example, for the antenna module 100*a* with the MHB+UHB antenna element 600, there may be one or two MHB+UHB antenna elements 600.

Optionally, referring to FIG. 7, there are two MHB+UHB antenna elements 600 in the antenna module 100*a*. The two MHB+UHB antenna elements 600 are respectively disposed at two opposite sides of the LB antenna element 700. The radiators of the two MHB+UHB antenna elements 600 are in capacitive coupling with the radiator of the LB antenna element 700.

When one antenna module 100*a* has two MHB+UHB antenna elements 600, the two MHB+UHB antenna elements 600 form a 2×2 multiple-input multiple-output (MIMO) MHB+UHB antenna. When two antenna modules 100*a* each have two MHB+UHB antenna elements 600, the four MHB+UHB antenna elements 600 form a 4×4 MIMO MHB+UHB antenna. When three antenna modules 100*a* each have two MHB+UHB antenna elements 600, the six MHB+UHB antenna elements 600 form a 6×6 MIMO MHB+UHB antenna.

As illustrated in FIG. 5, when the four antenna modules 100*a* each have two MHB+UHB antenna elements 600, the eight MHB+UHB antenna elements 600 form an 8×8 MIMO MHB+UHB antenna, maximizing the number of MHB+UHB antenna elements 600, and improving the transmission rate of antenna signals and communication quality of the electronic device 1000 as much as possible.

Certainly, there can also be another case where one MHB+UHB antenna element 600 is provided, or a 3×3 MIMO MHB+UHB antenna, a 5×5 MIMO MHB+UHB antenna, or a 7×7 MIMO MHB+UHB antenna can be formed.

In the implementation, by means of integration of one LB antenna element 700 and two MHB+UHB antenna elements 600 in the antenna module 100*a*, not only coverage of an LB, an NMB, and an UHB can be achieved, but also spaces for stacking are saved, and thus the size of the antenna module 100*a* can be significantly reduced. Therefore, in the limited space of the electronic device 1000, four antenna modules 100*a* can be arranged, where in each antenna module 100*a* one LB antenna element 700 and two MHB+UHB antenna elements 600 are integrated. In this way, an 8×8 MIMO MHB+UHB antenna is formed. With a multichannel duplex MHB+UHB antenna, throughput can be greatly improved to achieve high-speed transmission.

The antenna system 100 further includes a second controller 803. The second controller 803 is electrically connected to the multiple MHB+UHB antenna elements 600.

The second controller 803 is configured to control at least one of the multiple MHB+UHB antenna elements 600 to operate and control the MHB+UHB antenna element 600 to be connected with an LTE network or an NR network. The second controller 803 is configured to control part of the MHB+UHB antenna elements 600 to support an LTE MHB and an LET UHB, and control the other of the MHB+UHB antenna elements 600 to support an NR MHB and NR UHB, enabling the electronic device 1000 to support both 4G mobile communication signals and 5G mobile communication signals in the LB, realizing ultra-wideband CA and the dual connection between the 4G radio access network and the 5G-NR (EN-DC). When there are eight MHB+UHB antenna elements 600, the eight MHB+UHB antenna elements 600 are disposed at different positions of the electronic device 1000, and thus the electronic device 1000 can achieve 360 degrees coverage without dead angles. When part of the MHB+UHB antenna elements 600 is blocked or to which the head of the human body is close, the MHB+UHB antenna element 600 that is not blocked or to which no head of the human body is close is selected to operate, thus realizing intelligent switching of the MHB+UHB antenna elements 600.

In the disclosure, there is no specific limitation on the integration of the LB antenna element 700 and the two MHB+UHB antenna elements 600, and the following implementations are taken as examples for illustration. Certainly, the integration of the LB antenna element 700 and the two MHB+UHB antenna elements 600 includes but is not limited to the following implementations. In the implementation, the LB antenna element 700 is defined as the second antenna element 20, and the two MHB+UHB antenna elements 600 are defined as the first antenna element 10 and the third antenna element 30, respectively.

Figure 8:
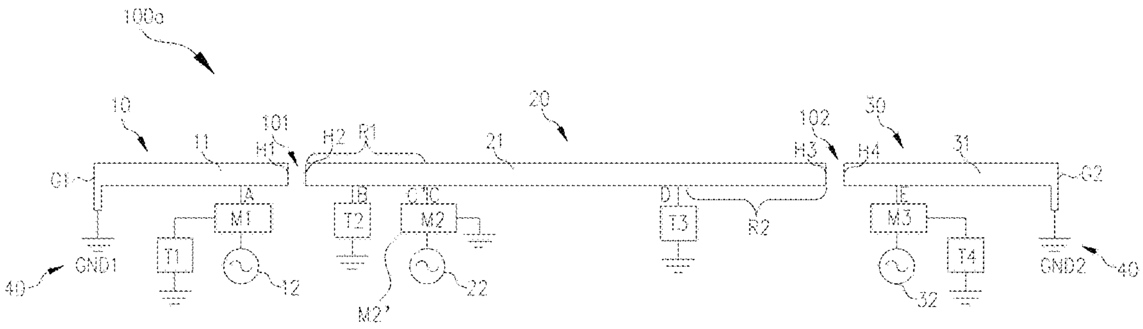
FIG. 8 is a schematic structural view of a second type of antenna module provided in implementations of the disclosure.

Referring to FIG. 8, the first antenna element 10 includes a first radiator 11, a first signal source 12, and a first frequency-selection filter circuit M1.

Referring to FIG. 8, the first radiator 11 includes a first ground end G1 and a first coupling end H1 opposite the first ground end G1, and a first feeding point A arranged between the first ground end G1 and the first coupling end H1.

The first ground end G1 is electrically connected to a reference ground 40. The reference ground 40 includes a first reference ground GND1. The first ground end G1 is electrically connected to the first reference ground GND1.

In one implementation, the first frequency-selection filter circuit M1 is arranged between the first feeding point A and the first signal source 12. In some implementations, the first signal source 12 is electrically connected to an input end of the first frequency-selection filter circuit M1, and an output end of the first frequency-selection filter circuit M1 is electrically connected to the first feeding point A of the first radiator 11. The first signal source 12 is configured to generate an excitation signal (also called an RF signal). The first frequency-selection filter circuit M1 is configured to filter out a clutter in the excitation signal transmitted by the first signal source 12 to obtain an MHB+UHB excitation signal, and transmits the MHB+UHB excitation signal to the first radiator 11, so that the first radiator 11 can transmit/receive a first electromagnetic wave signal.

Referring to FIG. 8, the second antenna element 20 includes a second radiator 21, a second signal source 22, and a second frequency-selection filter circuit M2.

Referring to FIG. 8, the second radiator 21 includes a second coupling end H2, a third coupling end H3 opposite the second coupling end H2, and a second feeding point C disposed between the second coupling end H2 and the third coupling end H3.

The second coupling end H2 is spaced apart from the first coupling end H1 to define a first gap 101. In other words, the second radiator 21 and the first radiator 11 define the first gap 101 therebetween. The first radiator 11 and the second radiator 21 are in capacitive coupling through the first gap 101. "Capacitive coupling" refers to that an electric field is generated between the first radiator 11 and the second radiator 21, and a signal of the first radiator 11 can be transmitted to the second radiator 21 through the electric field, and a signal of the second radiator 21 can be transmitted to the first radiator 11 through the electric field, so that electrical signal conduction between the first radiator 11 and the second radiator 21 can be achieved even the first radiator 11 and the second radiator 21 are in a disconnected state.

The size of the first gap 101 is not specifically limited in the disclosure. In the implementation, the size of the first gap 101 is less than or equal to 2 mm, but is not limited to this size, so as to facilitate capacitive coupling between the first radiator 11 and the second radiator 21.

The second frequency-selection filter circuit M2 is disposed between the second feeding point C and the second signal source 22. In some implementations, the second signal source 22 is electrically connected to an input end of the second frequency-selection filter circuit M2, and an output end of the second frequency-selection filter circuit M2 is electrically connected to the second radiator 21. The second signal source 22 is configured to generate an excitation signal, and the second frequency-selection filter circuit M2 is configured to filter out a clutter in the excitation signal transmitted by the second signal source 22 to obtain an excitation signal of an LB, and transmit the excitation signal of the LB to the second radiator 21, so that the second radiator 21 can transmit/receive a second electromagnetic wave signal.

Referring to FIG. 8, the third antenna element 30 includes a third signal source 32, a third frequency-selection filter circuit M3, and a third radiator 31. The third radiator 31 is disposed at a side of the second radiator 21 away from the first radiator 11, and the third radiator 31 and the second radiator 21 define a second gap 102 therebetween. The third radiator 31 is in capacitive coupling with the second radiator 21 through the second gap 102.

In some implementations, the third radiator 31 includes a fourth coupling end H4 and a second ground end G2 respectively at both ends of the third radiator 31, and a third feeding point E between the fourth coupling end H4 and the second ground end G2.

The reference ground 40 further includes a second reference ground GND2, and the second ground end G2 is electrically connected to the second reference ground GND2.

The fourth coupling end H4 and the third coupling end H3 defines the second gap 102 therebetween. The size of the second gap 102 is less than or equal to 2 mm, but is not limited to this size. One end of the third frequency-selection filter circuit M3 is electrically connected to the third feeding point E, and the other end of the third frequency-selection filter circuit M3 is electrically connected to the third signal source 32. Optionally, when the antenna module 100*a* is applied to the electronic device 1000, the third signal source 32 and the third frequency-selection filter circuit M3 are both disposed on the main printed circuit board 200. Optionally, the third signal source 32, the first signal source 12, and the second signal source 22 are the same signal source or different signal sources. The third frequency-selection filter circuit M3 is configured to filter out a clutter in an RF signal transmitted by the third signal source 32, so that the third antenna element 30 can transmit/receive a third electromagnetic wave signal.

The shape of the first radiator 11, the shape of the second radiator 21, and the shape of the third radiator 31 are not specifically limited in the disclosure, and include, but are not limited to, a strip-shape, a sheet-shape, a rod-shape, a coating-shape, a film-shape, etc. In the implementation, the first radiator 11, the second radiator 21, and the third radiator 31 are all strip-shaped.

The formation of the first radiator 11, the formation of the second radiator 21, and the formation of third radiator 31 are not specifically limited in the disclosure. The first radiator 11, the second radiator 21, and the third radiator 31 can be flexible printed circuit (FPC) antenna radiators, laser direct structuring (LDS) antenna radiators, print direct structuring (PDS) antenna radiators, metal branches, or the like.

In some implementations, the first radiator 11, the second radiator 21, and the third radiator 31 each are made of conductive material, including but not limited to, metal, transparent conductive oxide (such as indium tin oxide (ITO)), carbon nanotube, graphene, and so on. In the implementation, the first radiator 11, the second radiator 21, and the third radiator 31 each are made of metal material, such as silver, copper, etc.

When the antenna module 100*a* is applied to the electronic device 1000, the first signal source 12, the second signal source 22, the first frequency-selection filter circuit M1, and the second frequency-selection filter circuit M2 can all be disposed on the main printed circuit board 200 of the electronic device 1000. In the implementation, with the first frequency-selection filter circuit M1 and the second frequency-selection filter circuit M2, a band of an electromagnetic wave signal transmitted/received by the first antenna element 10 is different from a band of an electromagnetic wave signal transmitted/received by the second antenna element 20, thereby improving an isolation between the first antenna element 10 and the second antenna element 20. In other words, with the first frequency-selection filter circuit M1 and the second frequency-selection filter circuit M2, the electromagnetic wave signals transmitted/received by the first antenna element 10 and the second antenna element 20 can be isolated from each other to avoid mutual interference.

Resonant modes generated by the capacitive coupling between the first antenna element 10 and the second antenna element 20 are not specifically limited in the disclosure. The following implementations are taken as examples to illustrate the resonant modes generated by the capacitive coupling between the first antenna element 10 and the second antenna element 20, but the resonant modes generated by the capacitive coupling between the first antenna element 10 and the second antenna element 20 include but are not limited to the following implementations.

The first antenna element 10 is configured to generate multiple resonant modes. At least one resonant mode is generated by the capacitive coupling between the first radiator 11 and the second radiator 21.

Figure 9:
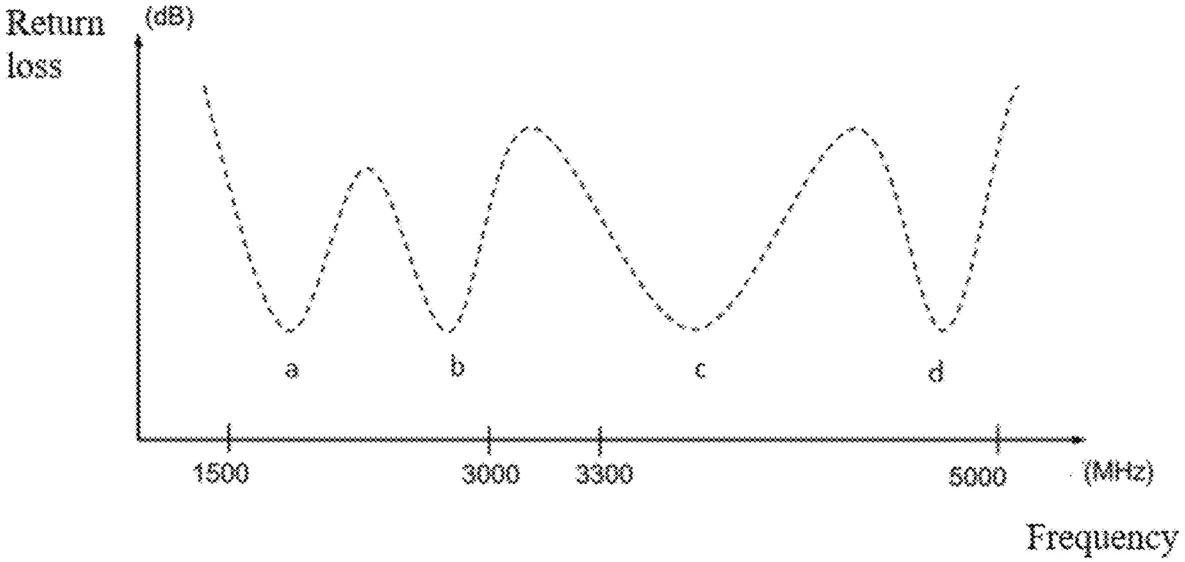
FIG. 9 is a return loss curve diagram of several resonant modes of the first antenna element in FIG. 8.

Referring to FIG. 9, the first antenna element 10 is configured to generate a first resonant mode a, a second resonant mode b, a third resonant mode c, and a fourth resonant mode d. It needs to be noted that the resonant modes generated by the first antenna element 10 may further include other modes besides the four modes listed above, and the four resonant modes listed above are modes with a relatively high efficiency.

Referring to FIG. 9, electromagnetic waves corresponding to the second resonant mode b and the third resonant mode c are both generated by the capacitive coupling between the first radiator 11 and the second radiator 21. Bands corresponding to the first resonant mode a, the second resonant mode b, the third resonant mode c, and the fourth resonant mode d are a first sub-band, a second sub-band, a third sub-band, and a fourth sub-band, respectively. In one implementation, the first sub-band ranges from 1900 MHz to 2000 MHz, the second sub-band ranges from 2600 MHz to 2700 MHz, the third sub-band ranges from 3800 MHz to 3900 MHz, and the fourth sub-band ranges from 4700 MHz to 4800 MHz. In other words, an electromagnetic wave signal generated by the first antenna element 10 is in an MHB (1000 MHz-3000 MHz) and a UHB (3000 MHz-10000 MHz). By adjustment of resonant frequencies of the above resonant modes, full coverage of the MHB and the UHB by the first antenna element 10 can be achieved, and a relatively high efficiency in a required band can be achieved.

As described above, when the first antenna element 10 is not coupled to another antenna element, the first antenna element 10 generates the first resonant mode a and the fourth resonant mode d. When the first antenna element 10 is coupled with the second antenna element 20, the first antenna element 10 not only generates the first resonant mode a and the fourth resonant mode d, but also generates the second resonant mode b and the third resonant mode c. Thus, a bandwidth of the antenna module 100*a* increases.

The first radiator 11 and the second radiator 21 are spaced apart from and coupled with each other, i.e., the first radiator 11 and the second radiator 21 are shared-aperture. When the antenna module 100*a* operates, a first excitation signal generated by the first signal source 12 can be coupled to the second radiator 21 through the first radiator 11. In other words, when the first antenna element 10 operates, not only the first radiator 11 can be used to transmit/receive an electromagnetic wave signal, but also the second radiator 21 of the second antenna element 20 can be used to transmit/receive an electromagnetic wave signal, so that the first antenna element 10 can operate in a relatively wide band. Similarly, the second radiator 21 and the first radiator 11 are spaced apart from and coupled with each other, and when the antenna module 100*a* operates, a second excitation signal generated by the second signal source 22 can be coupled to the first radiator 11 through the second radiator 21. In other words, when the second antenna element 20 operates, not only the second radiator 21 can be used to transmit/receive an electromagnetic wave signal, but also the first radiator 11 of the first antenna element 10 can be used to transmit/receive an electromagnetic wave signal, so that the second antenna element 20 can operate in a relatively wide band. Since when the second antenna element 20 operates, both the second radiator 21 and the first radiator 11 can be used, and when the first antenna element 10 operates, both the first radiator 11 and the second radiator 21 can be used, not only the radiation performance of the antenna module 100*a* can be improved, but also multiplexing of the radiators and multiplexing of spaces are achieved, which is beneficial for reducing the size of the antenna module 100*a* and the overall volume of the electronic device 1000.

By means of that the first radiator 11 of the first antenna element 10 and the second radiator 21 of the second antenna element 20 define the first gap 101 therebetween, the first antenna element 10 is configured to transmit/receive an electromagnetic wave signal of a relatively high band, and the second antenna element 20 is configured to transmit/receive an electromagnetic wave signal of a relatively low band, on the one hand, when the antenna module 100*a* operates, the first radiator 11 and the second radiator 21 can be in capacitive coupling to generate more modes, thereby increasing the bandwidth of the antenna module 100*a*, on the other hand, the band for the first antenna element 10 is an NMB and the band for the second antenna element 20 is an LB, and thus the isolation between the first antenna element 10 and the second antenna element 20 can be effectively increased, which is beneficial for radiating an electromagnetic wave signal of a required band by the antenna module 100*a*. Since the radiators of the first antenna element 10 and the second antenna element 20 are mutually multiplexed, integration of multiple antenna elements can be realized, and thus the bandwidth of the antenna module 100*a* can be increased, and a component-stacking space in the antenna module 100*a* can be reduced, thereby facilitating miniaturization of the electronic device 1000.

In related art, a large number of antenna elements or relatively long radiators are required to support the first resonant mode, the second resonant mode, the third resonant mode, and the fourth resonant mode, in this case, the antenna module is relatively large in volume. For the antenna module 100*a* in the implementation of the disclosure, no additional antenna element is needed to support the second resonant mode b and the third resonant mode c, and thus the antenna module 100*a* is relatively small in volume. With usage of additional antennas to support the second resonant mode b and the third resonant mode c, the cost of an antenna module is increased, and when the antenna module is applied to an electronic device, it is difficult to stack the antenna module with other components. For the antenna module 100*a* in the implementation of the disclosure, no additional antenna element is needed to support the second resonant mode b and the third resonant mode c, so that the cost of the antenna module 100 is relatively low, and when the antenna module 100*a* is applied to the electronic device 1000, it is relatively easy to stack the antenna module 100*a*. In addition, with usage of additional antennas to support the second resonant mode b and the third resonant mode b, an RF insertion loss of an antenna module can be increased. RF insertion loss of the antenna module 100*a* of the disclosure can be reduced.

The implementations in which a band of an electromagnetic wave signal transmitted/received by the first antenna element 10 is different from a band of an electromagnetic wave signal transmitted/received by the second antenna element 20 include but are not limited to the following implementations.

In some implementations, the first signal source 12 and the second signal source 22 can be the same signal source or different signal sources.

In one possible implementation, the first signal source 12 and the second signal source 22 can be the same signal source. The same signal source transmits an excitation signal to the first frequency-selection filter circuit M1 and the second frequency-selection filter circuit M2, respectively. The first frequency-selection filter circuit M1 is a filter circuit that blocks LB signals and allows NMB and UHB signals to pass. The second frequency-selection filter circuit M2 is a filter circuit that blocks MHB and UHB signals and allows LB signals to pass. Therefore, the NMB and UHB parts of the excitation signal flow to the first radiator 11 through the first frequency-selection filter circuit M1, enabling the first radiator 11 to transmit/receive the first electromagnetic wave signal. The LB part of the excitation signal flows to the second radiator 21 through the second frequency-selection filter circuit M2, enabling the second radiator 21 to transmit/receive the second electromagnetic wave signal.

In another possible implementation, the first signal source 12 and the second signal source 22 are different signal sources. The first signal source 12 and the second signal source 22 can be integrated into a chip or each can be packaged separately. The first signal source 12 is configured to generate a first excitation signal, and the first excitation signal is loaded to the first radiator 11 through the first frequency-selection filter circuit M1, enabling the first radiator 11 to transmit/receive the first electromagnetic wave signal. The second signal source 22 is configured to generate a second excitation signal, and the second excitation signal is loaded to the second radiator 21 through the second frequency-selection filter circuit M2, enabling the second radiator 21 to transmit/receive the second electromagnetic wave signal.

It can be understood that the first frequency-selection filter circuit M1 includes but is not limited to a capacitor(s), an inductor(s), a resistor(s), etc. that are connected in series and/or in parallel, and can include multiple branches formed by a capacitor(s), an inductor(s), and a resistor(s) that are connected in series and/or in parallel, and a switch(es) configured to control on/off of the multiple branches. By controlling on/off of different switches, frequency-selection parameters (including a resistance value, an inductance value, and a capacitance value) of the first frequency-selection filter circuit M1can be adjusted, and thus a filtering range of the first frequency-selection filter circuit M1 can be adjusted, to enable the first antenna element 10 to transmit/receive the first electromagnetic wave signal. Similarly, the second frequency-selection filter circuit M2 includes but is not limited to a capacitor(s), an inductor(s), a resistor(s), etc. that are connected in series and/or in parallel, and can include multiple branches formed by a capacitor(s), an inductor(s), and a resistor(s) that are connected in series and/or in parallel, and a switch(es) configured to control on/off of the multiple branches. By controlling on/off of different switches, frequency-selection parameters of the second frequency-selection filter circuit M2 (including a resistance value, an inductance value, and a capacitance value) can be adjusted, and thus a filtering range of the second frequency-selection filter circuit M2 can be adjusted, enabling the second antenna element 20 to transmit/receive the second electromagnetic wave signal. The first frequency-selection filter circuit M1 and the second frequency-selection filter circuit M2 can also be called matching circuits.

Referring to FIGS. 10 to 17, FIGS. 10 to 17 are schematic diagrams of the first frequency-selection filter circuit M1 provided in various implementations. The first frequency-selection filter circuit M1 includes one or more of the following circuits.

Figure 10:
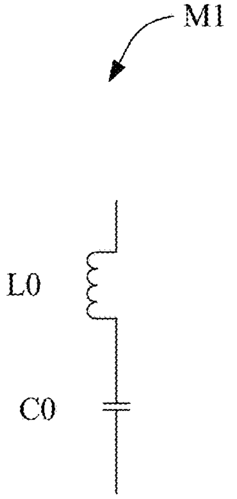
FIG. 10 is a schematic structural view of a first type of first frequency-selection filter circuit provided in implementations of the disclosure.

Referring to FIG. 10, the first frequency-selection filter circuit M1 includes a band-pass circuit formed by an inductor L0 and a capacitor C0 connected in series.

Figure 11:
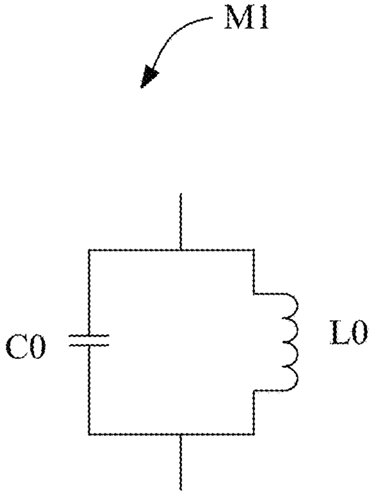
FIG. 11 is a schematic structural view of a second type of first frequency-selection filter circuit provided in implementations of the disclosure.

Referring to FIG. 11, the first frequency-selection filter circuit M1 includes a band-stop circuit formed by an inductor L0 and a capacitor C0 connected in parallel.

Figure 12:
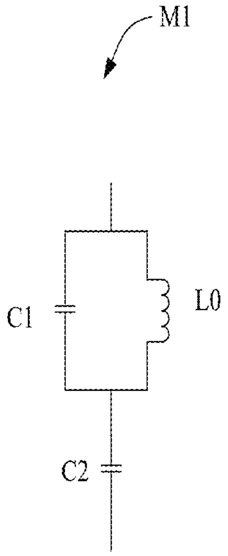
FIG. 12 is a schematic structural view of a third type of first frequency-selection filter circuit provided in implementations of the disclosure.

Referring to FIG. 12, the first frequency-selection filter circuit M1 includes an inductor L0, a first capacitor C1, and a second capacitor C2. The inductor L0 is connected in parallel with the first capacitor C1, and the second capacitor C2 is electrically connected to a node where the inductor L0 is electrically connected to the first capacitor C1.

Figure 13:
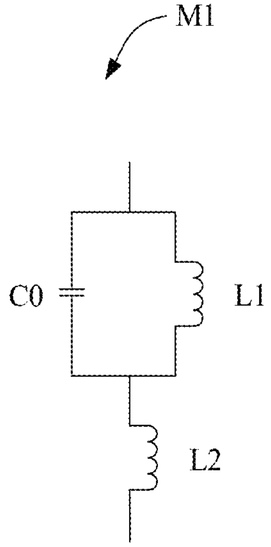
FIG. 13 is a schematic structural view of a fourth type of first frequency-selection filter circuit provided in implementations of the disclosure.

Referring to FIG. 13, the first frequency-selection filter circuit M1 includes a capacitor C0, a first inductor L1, and a second inductor L2. The capacitor C0 is connected in parallel with the first inductor L1, and the second inductor L2 is electrically connected to a node where the capacitor C0 is electrically connected to the first inductor L1.

Figure 14:
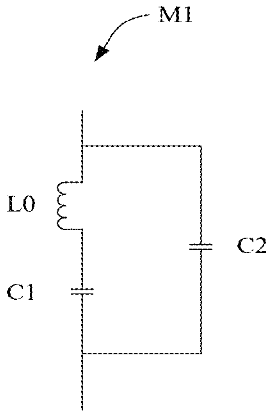
FIG. 14 is a schematic structural view of a fifth type of first frequency-selection filter circuit provided in implementations of the disclosure.

Referring to FIG. 14, the first frequency-selection filter circuit M1 includes an inductor L0, a first capacitor C1, and a second capacitor C2. The inductor L0 is connected in series with the first capacitor C1, one end of the second capacitor C2 is electrically connected to a first end of the inductor L0 that is not connected to the first capacitor C1, and the other end of the second capacitor C2 is electrically connected to one end of the first capacitor C1 that is not connected to the inductor L0.

Figure 15:
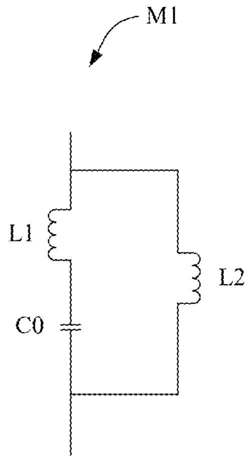
FIG. 15 is a schematic structural view of a sixth type of first frequency-selection filter circuit provided in implementations of the disclosure.

Referring to FIG. 15, the first frequency-selection filter circuit M1 includes a capacitor C0, a first inductor L1, and a second inductor L2. The capacitor C0 is connected in series with the first inductor L1, one end of the second inductor L2 is connected to one end of the capacitor C0 that is not connected to the first inductor L1, and the other end of the second inductor L2 is electrically connected to one end of the first inductor L1 that is not connected to the capacitor C0.

Figure 16:
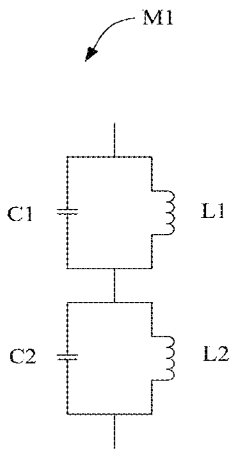
FIG. 16 is a schematic structural view of a seventh type of first frequency-selection filter circuit provided in implementations of the disclosure.

Referring to FIG. 16, the first frequency-selection filter circuit M1 includes a first capacitor C1, a second capacitor C2, a first inductor L1, and a second inductor L2. The first capacitor C1 is connected in parallel with the first inductor L1, the second capacitor C2 is connected in parallel with the second inductor L2, and one end of a circuit formed by the second capacitor C2 and the second inductor L2 connected in parallel is connected to one end of a circuit formed by the first capacitor C1 and the first inductor L1 connected in parallel.

Figure 17:
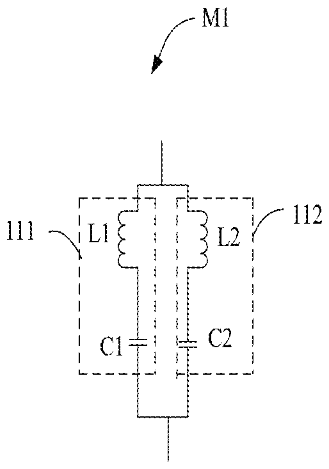
FIG. 17 is a schematic structural view of an eighth type of first frequency-selection filter circuit provided in implementations of the disclosure.

Referring to FIG. 17, the first frequency-selection filter circuit M1 includes a first capacitor C1, a second capacitor C2, a first inductor L1, and a second inductor L2. The first capacitor C1 and the first inductor L1 are connected in series to define a first unit 111, the second capacitor C2 and the second inductor L2 are connected in series to define a second unit 112, and the first unit 111 and the second unit 112 are connected in parallel.

Figure 18:
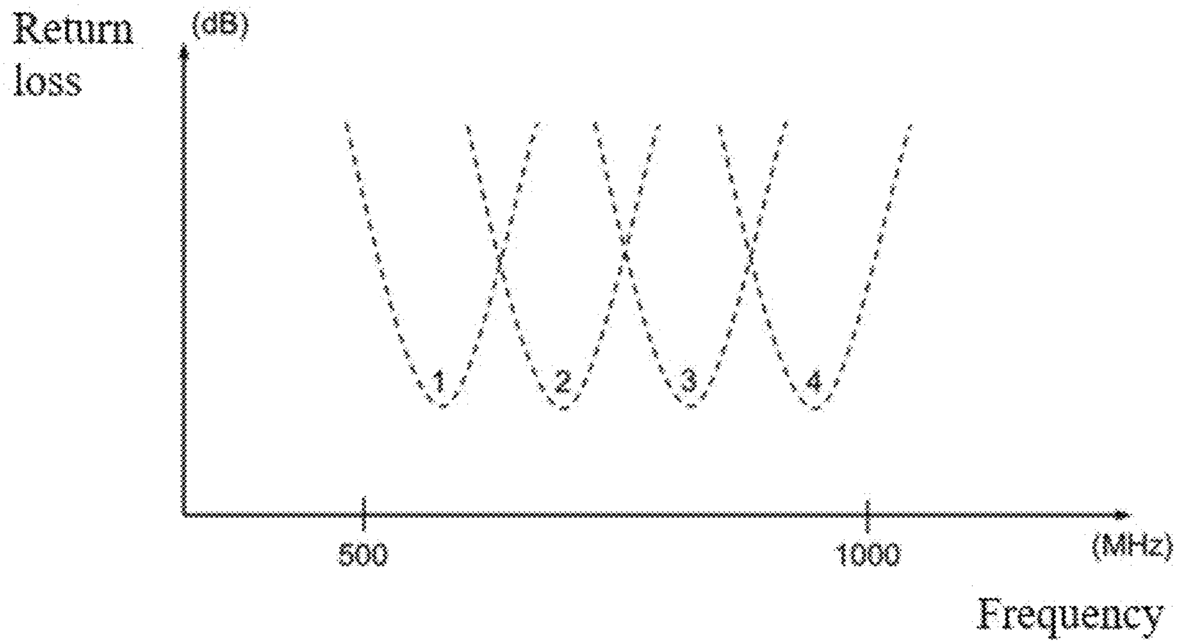
FIG. 18 is a return loss curve diagram of several resonant modes of a second antenna element provided in FIG. 8.

Referring to FIG. 18, the band of the electromagnetic wave signal corresponding to the resonant mode generated when the second antenna element 20 operates is below 1000 MHz, for example, ranges from 500 MHz to 1000 MHz. By adjustment of the resonant frequencies of the above resonant modes, full coverage of the LB by the second antenna element 20 can be realized, and a relatively high efficiency in a required band can be achieved. Thus, the second antenna element 20 can transmit/receive an electromagnetic wave signal of an LB, such as all 4G (also known as LTE) LBs and 5G (also known as NR) LBs. When the second antenna element 20 and the first antenna element 10 operate at the same time, electromagnetic wave signals of all LBs, all MHBs, and all UHBs of 4G and 5G, including LTE-1/2/3/4/7/32/40/41, NR-1/3/7/40/41/77/78/79, Wi-Fi 2.4G, Wi-Fi 5G, GPS-L1, GPS-L5, etc., can be covered at the same time, achieving ultra-wideband CA and the dual connection between the 4G radio access network and the 5G-NR (EN-DC).

The third antenna element 30 is configured to generate multiple resonant modes. The multiple resonant modes generated by the third antenna element 30 are generated due to capacitive coupling between the second radiator 21 and the third radiator 31.

Figure 19:
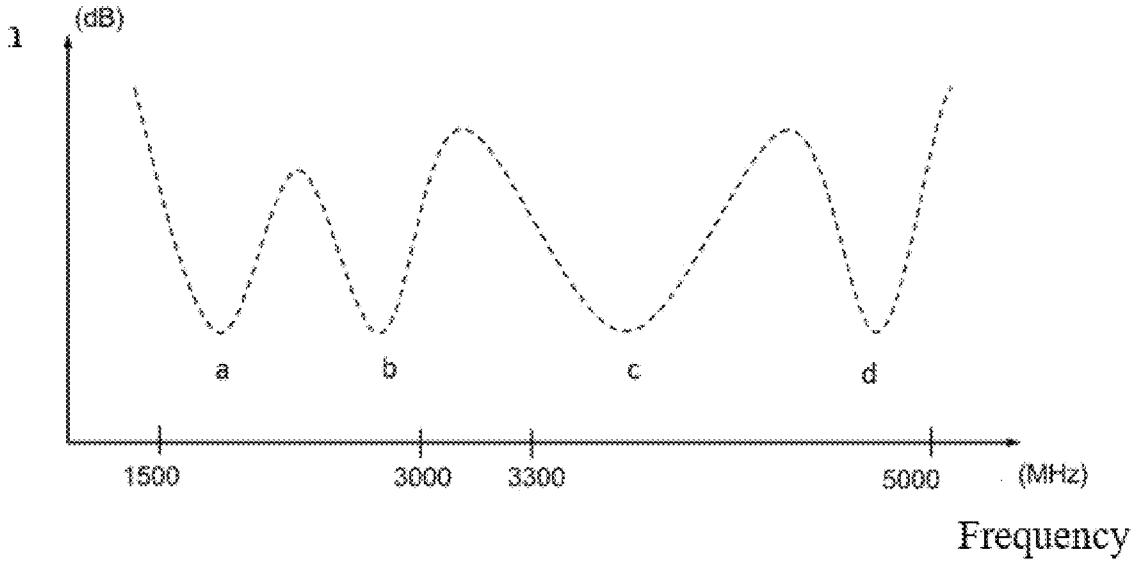
FIG. 19 is a return loss curve diagram of several resonant modes of a third antenna element provided in FIG. 8.

Referring to FIG. 19, the multiple resonant modes generated by the third antenna element 30 include at least a sixth resonant mode e, a seventh resonant mode f, an eighth resonant mode g, and a ninth resonant mode h. It needs to be noted that the multiple resonant modes generated by the third antenna element 30 also include other modes besides the above-listed resonant modes. The above four resonant modes are modes with a relatively high efficiency.

The seventh resonant mode f and the eighth resonant mode g are both generated by coupling between the third radiator 31 and the second radiator 21. Bands corresponding to the sixth resonant mode e, the seventh resonant mode f, the eighth resonant mode g, and the ninth resonant mode h are a fifth sub-band, a sixth sub-band, a seventh sub-band, and an eighth sub-band, respectively. In one implementation, the fifth sub-band ranges from 1900 MHz to 2000 MHz, the sixth sub-band ranges from 2600 MHz to 2700 MHz, the seventh sub-band ranges from 3800 MHz to 3900 MHz, and the eighth sub-band ranges from 4700 MHz to 800 MHz. In other words, bands corresponding to the multiple resonant modes generated by the third antenna element 30 are an MHB (1000 MHz-3000 MHz) and a UHB (3000 MHz-10000 MHz). By adjustment of the resonant frequencies of the above resonant modes, full coverage of the MHB and the UHB by the third antenna element 30 can be achieved, and a relatively high efficiency in a required band can be achieved.

Optionally, the third antenna element 30 is similar to the first antenna element 10 in structure. The effect of the capacitive coupling between the third antenna element 30 and the second antenna element 20 is similar to the effect of the capacitive coupling between the first antenna element 10 and the second antenna element 20. Therefore, when the antenna module 100*a* operates, a third excitation signal generated by the third signal source 32 can be coupled to the second radiator 21 through the third radiator 31. In other words, when the third antenna element 30 operates, not only the third radiator 31 can be used to transmit/receive an electromagnetic wave signal, but also the second radiator 21 of the second antenna element 20 can be used to transmit/receive an electromagnetic wave signal, so that an operating bandwidth of the third antenna element 30 can be increased without an additional radiator(s).

Since the first antenna element 10 is configured to transmit/receive an NMB and a UHB, the second antenna element 20 is configured to transmit/receive an LB, and the third antenna element 30 is configured to transmit/receive an NMB and a UHB, the first antenna element 10 and the second antenna element 20 are isolated from each other through bands to avoid mutual interference of signals, and the second antenna element 20 and the third antenna element 30 are isolated from each other through a physical spacing to avoid mutual interference of signals, which facilitates control of the antenna module 100*a* to transmit/receive an electromagnetic wave signal of a required band.

In addition, the first antenna element 10 and the third antenna element 30 can be disposed in different orientations or positions of the electronic device 1000 to facilitate switching between the first antenna element 10 and the third antenna element 30 in different scenarios. For example, when the electronic device 1000 is switched between a landscape mode and a portrait mode, it may be switched between the first antenna element 10 and the third antenna element 30, or it can be switched to the third antenna element 30 when the first antenna element 10 is blocked and it can be switched to the first antenna element 10 when the third antenna element 30 is blocked, so that relatively good transmission/reception of an electromagnetic wave signal of an MHB and an electromagnetic wave signal of a UHB can be achieved in different scenarios.

In the implementation, take that the antenna module 100*a* includes the first antenna element 10, the second antenna element 20, and the third antenna element 30 as an example, tuning manners for realizing coverage of electromagnetic wave signals of all LBs, all MHBs, and all UHBs of 4G and 5G are illustrated through examples.

Figure 20:
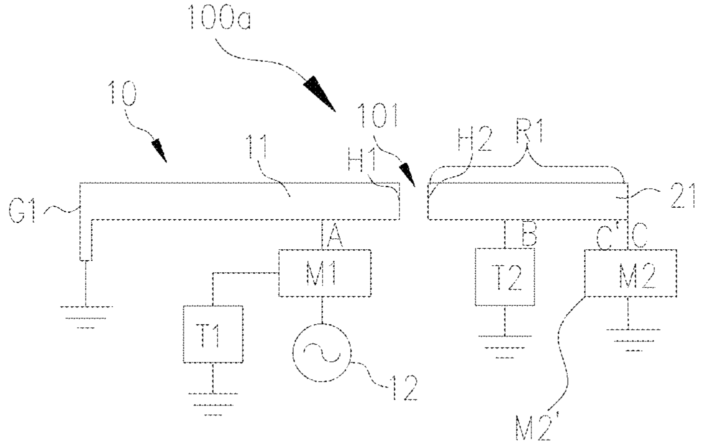
FIG. 20 is an equivalent circuit diagram of a first antenna element provided in FIG. 8.

Referring to FIG. 8 and FIG. 20, the second radiator 21 includes a first coupling point C'. The first coupling point C' is located between the second coupling end H2 and the third coupling end H3. A portion of the second radiator 21 between the first coupling point C' and one end of the second radiator 21 is configured to be coupled with an adjacent radiator.

Referring to FIG. 8, the first coupling point C' is located at a position close to the second coupling end H2, and a portion of the second radiator 21 between the first coupling point C' and the second coupling end H2 is configured to be coupled to the first radiator 11. Furthermore, a first coupling segment R1 is defined between the first coupling point C' and the second coupling end H2. The first coupling segment R1 is configured to be capacitively coupled to the first radiator 11. The length of the first coupling segment R1 is ¼ λ1, where λ1 is a wavelength of an electromagnetic wave signal of the first band.

In other implementations, the first coupling point C' is located at a position close to the third coupling end H3, and a portion of the second radiator 21 between the first coupling point C' and the third coupling end H3 is configured to be coupled to the third radiator 31. The portion of the second radiator 21 between the first coupling point C' and the third coupling end H3 is configured to be capacitively coupled to the third radiator 31. A length of the portion of the second radiator 21 between the first coupling point C' and the third coupling end H3 is ¼λ2, where λ2 is a wavelength of an electromagnetic wave signal of the third band.

In the implementation, take that the first coupling point C' is located at a position close to the second coupling end H2 as an example for illustration. The following arrangement of the first coupling point C' is also applicable to the case where the first coupling point C' is located at a positon close to the third coupling end H3.

The first coupling point C' is configured to be grounded, so that the first excitation signal transmitted by the first signal source 12 is filtered by the first frequency-selection filter circuit M1 and then transmitted from the first feeding point A to the first radiator 11. The first excitation signal acts on the first radiator 11 in different manners, for example, the first excitation signal acts on the first radiator 11 from the first feeding point A to the first ground end G1 and enters the reference ground 40 at the first ground end G1 to form an antenna loop. Alternatively, the first excitation signal acts on the first radiator 11 from the first feeding point A to the first coupling end H1, is coupled to the second coupling end H2 and the first coupling point C' through the first gap 101, and enters the reference ground 40 at the first coupling point C', to form another coupled antenna loop.

In some implementations, the first antenna element 10 generates the first resonant mode a when a portion of the first antenna element 10 between the first ground end G1 and the first coupling end H1 operates in a fundamental mode. In some implementations, when the first excitation signal generated by the first signal source 12 acts between the first ground end G1 and the second coupling end H2, the first resonant mode a is generated, and an efficiency is relatively high at the resonant frequency of the first resonant mode a, thereby improving the communication quality of the electronic device 1000 at the resonance frequency of the first resonant mode a. It can be understood that the fundamental mode is also a ¼ wavelength mode and a resonant mode with a relatively high efficiency. When the portion of the first antenna element 10 between the first ground end G1 and the first coupling end H1 operates in the fundamental mode, an effective electrical length of the portion of the first antenna element 10 between the first ground end G1 and the first coupling end H1 is ¼ of the wavelength corresponding to the resonant frequency of the first resonant mode a.

When the first coupling segment R1 operates in the fundamental mode, the first antenna element 10 generates the second resonant mode b. The resonant frequency of the second resonant mode b is greater than that of the first resonant mode a. In some implementations, when the first excitation signal generated by the first signal source 12 acts between the second coupling end H2 and the first coupling point C', the second resonant mode b is generated, and an efficiency is relatively high at the resonant frequency of the second resonant mode b, thereby improving the communication quality of the electronic device 1000 at the resonant frequency of the second resonant mode b.

When a portion of the first antenna element 10 between the first feeding point A and the first coupling end H1 operates in the fundamental mode, the first antenna element 10 generates the third resonant mode c. The resonant frequency of the third resonant mode c is higher than that of the second resonant mode b.

In some implementations, when the first excitation signal generated by the first signal source 12 acts between the first feeding point A and the first coupling end H1, the third resonant mode c is generated, and a transceiving efficiency is relatively high at the resonant frequency of the third resonant mode c, thereby improving the communication quality of the electronic device 1000 at the resonant frequency of the third resonant mode c.

When the portion of the first antenna element 10 between the first ground end G1 and the first coupling end H1operates in a third-order mode, the first antenna element 10 generates the fourth resonant mode d.

In some implementations, when the first excitation signal generated by the first signal source 12 acts between the first feeding point A and the first coupling end H1, the fourth resonant mode d is generated, and a transceiving efficiency is relatively high at the resonant frequency of the fourth resonant mode d, thereby improving the communication quality of the electronic device 1000 at the resonant frequency of the fourth resonant mode d. The resonant frequency of the fourth resonant mode d is greater than that of the third resonant mode c.

Referring to FIG. 20, the first antenna element 10 further includes a first frequency-tuning circuit T1. In one implementation, the first frequency-tuning circuit T1 is configured for matching adjustment. In some implementations, one end of the first frequency-tuning circuit T1 is electrically connected to the first frequency-selection filter circuit M1, and the other end of the first frequency-tuning circuit T1 is grounded. In another implementation, the first frequency-tuning circuit T1 is configured for aperture adjustment. In some implementations, one end of the first frequency-tuning circuit T1 is electrically connected between the first ground end G1 and the first feeding point A, and the other end of the first frequency-tuning circuit T1 is grounded. In the above two connection manners, the first frequency-tuning circuit T1 is configured to adjust the resonant frequency of the first resonant mode a, the resonant frequency of the third resonant mode c, and the resonant frequency of the fourth resonant mode d by adjusting an impedance of the first radiator 11.

In one implementation, the first frequency-tuning circuit T1 includes, but is not limited to, a capacitor(s), an inductor (s), a resistor(s), etc. that are connected in series and/or parallel. The first frequency-tuning circuit T1 may include multiple branches formed by a capacitor(s), an inductor(s), and a resistor(s) that are connected in series and or parallel, and a switch(es) configured to control on and off of the branches. By controlling on and off of different switches, a frequency-tuning parameter(s) of the first frequency-tuning circuit T1 (including a resistance value, an inductance value, and a capacitance value) can be adjusted to adjust the impedance of the first radiator 11, thereby adjusting the resonance frequency of the first resonant mode a. For the specific structure of the first frequency-tuning circuit T1, reference can be made to the specific structure of the first frequency-selection filter circuit M1.

For example, the resonant frequency of the first resonant mode a ranges from 1900 MHz to 2000 MHz. When the electronic device 1000 needs to transmit/receive an electromagnetic wave signal of a band ranging from 1900 MHz to 2000 MHz, the frequency-tuning parameter(s) (such as a resistance value, an inductance value, and a capacitance value) of the first frequency-tuning circuit T1 can be adjusted to make the first antenna element 10 operate in the first resonant mode a. When the electronic device 1000 needs to transmit/receive an electromagnetic wave signal of a band ranging from 1800 MHz to 1900 MHz, the frequency-tuning parameter(s) (such as a resistance value, an inductance value, and a capacitance value) of the first frequency-tuning circuit T1 can be further adjusted to shift the resonant frequency of the first resonant mode a toward an LB. When the electronic device 1000 needs to transmit/receive an electromagnetic wave signal of a band ranging from 2000 MHz to 2100 MHz, the frequency-tuning parameter(s) (such as a resistance value, an inductance value, and a capacitance value) of the first frequency-tuning circuit T1 can be further adjusted to shift the resonant frequency of the first resonant mode a toward a HB. Therefore, by means of adjustment of the frequency-tuning parameter(s) of the first frequency-tuning circuit T1, the first antenna element 10 can cover a relatively wide band.

The specific structure and adjustment manner of the first frequency-tuning circuit T1 are not specifically limited in the disclosure.

In another implementation, the first frequency-tuning circuit T1 includes, but is not limited to, a variable capacitor. By means of adjustment of a capacitance value of the variable capacitor, the frequency-tuning parameter(s) of the first frequency-tuning circuit T1 can be adjusted to adjust the impedance of the first radiator 11, thereby adjusting the resonant frequency of the first resonant mode a.

Referring to FIG. 8 and FIG. 20, the second radiator 21 further includes a first frequency-tuning point B, where the first frequency-tuning point B is located between the second coupling end H2 and the first coupling point C'. The second antenna element 20 further includes a second frequency-tuning circuit T2. In one implementation, the second frequency-tuning circuit T2 is configured for aperture adjustment. In some implementations, one end of the second frequency-tuning circuit T2 is electrically connected to the first frequency-tuning point B, and the other end of the second frequency-tuning circuit T2 is grounded. In another implementation, the second frequency-tuning circuit T2 is configured for matching adjustment. In some implementations, one end of the second frequency-tuning circuit T2 is electrically connected to the second frequency-selection filter circuit M2, and the other end of the second frequency-tuning circuit T2 is grounded. The second frequency-tuning circuit T2 is configured to adjust the resonant frequency of the second resonant mode b and the resonant frequency of the third resonant mode c.

The second frequency-tuning circuit T2 is configured to adjust the resonant frequency of the third resonant mode c by adjusting an impedance of the portion of the first radiator 11 between the second coupling end H2 and the first coupling point C'.

In one implementation, the second frequency-tuning circuit T2 includes but is not limited to a capacitor(s), an inductor(s), a resistor(s), etc. that are connected in series and/or in parallel. The second frequency-tuning circuit T2 may include multiple branches formed by a capacitor(s), an inductor(s), a resistor(s) that are connected in series and/or in parallel, and a switch(es) configured to control on and off of the multiple branches. By controlling on and off of different switches, an frequency-tuning parameter(s) of the second frequency-tuning circuit T2 (including a resistance value, an inductance value, and a capacitance value) can be adjusted to adjust an impedance of the portion of the first radiator 11 between the second coupling end H2 and the first coupling point C', so that the first antenna element 10 can transmit/receive an electromagnetic wave signal of the resonant frequency of the third resonant mode c or of a frequency close to the resonant frequency of the third resonant mode c.

The specific structure and adjustment manner of the second frequency-tuning circuit T2 are not specifically limited in the disclosure.

In another implementation, the second frequency-tuning circuit T2 includes but is not limited to a variable capacitor. By means of adjustment of a capacitance value of the variable capacitor, the frequency-tuning parameter(s) of the second frequency-tuning circuit T2 can be adjusted, to adjust the impedance of the portion of the first radiator 11 between the second coupling end H2 and the first coupling point C', so that the resonant frequency of the third resonant mode c is adjusted.

Optionally, the second feeding point C is the first coupling point C'. The second frequency-selection filter circuit M2 can adjust the resonant frequency of the third resonant mode c. By using the first coupling point C' as the second feeding point C, the first coupling point C' not only can serve as a feeding point of the second antenna element 20, but also can be used to make the second antenna element 20 be able to be coupled with the first antenna element 10, such that the antenna is compact in structure. Certainly, in other implementations, the second feeding point C can be located between the first coupling point C' and the third coupling end H3.

The second excitation signal generated by the second signal source 22 is filtered and adjusted by the second frequency-selection filter circuit M2 and then acts between the first frequency-tuning point B and the third coupling end H3 to generate the fifth resonant mode.

Figure 21:
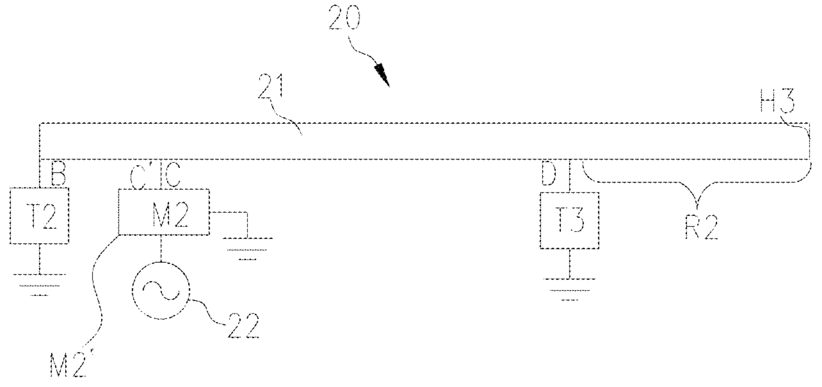
FIG. 21 is an equivalent circuit diagram of a second antenna element provided in FIG. 8.

Furthermore, referring to FIG. 8 and FIG. 21, the second radiator 21 further includes a second frequency-tuning point D, where the second frequency-tuning point D is located between the second feeding point C and the third coupling end H3. The second antenna element 20 further includes a third frequency-tuning circuit T3. In one implementation, the third frequency-tuning circuit T3 is configured for aperture adjustment. In some implementations, one end of the third frequency-tuning circuit T3 is electrically connected to the second frequency-tuning point D, and the other end of the third frequency-tuning circuit T3 is grounded. The third frequency-tuning circuit T3 is configured to adjust the resonant frequency of the fifth resonant mode by adjusting the impedance of the portion of the second radiator 21 between the first frequency-tuning point B and the third coupling end H3.

A length of the portion of the second radiator 21 between the first frequency-tuning point B and the third coupling end H3 can be approximately ¼ of a wavelength of an electromagnetic wave signal of the second band, so that the second antenna element 20 can have a relatively high radiation efficiency.

In addition, the first frequency-tuning point B is grounded, the first coupling point C' serves as the second feeding point C, and the second antenna element 20 is an inverted-F antenna. By means of adjustment of the position of the second feeding point C, impedance matching of the second antenna element 20 can be conveniently adjusted.

In one implementation, the third frequency-tuning circuit T3 includes but is not limited to a capacitor(s), an inductor (s), a resistor(s), etc. that are connected in series and/or in parallel. The third frequency-tuning circuit T3 can include multiple branches formed by a capacitor(s), an inductor(s), a resistor(s) that are connected in series and/or in parallel, and a switch(es) configured to control on/off of the branches. By controlling on/off of different switches, an frequency-tuning parameter(s) of the third frequency-tuning circuit T3 (including a resistance value, an inductance value, and a capacitance value) can be adjusted, to adjust the impedance of the portion of the second radiator 21 between the first frequency-tuning point B and the third coupling end H3, so that the second antenna element 20 can transmit/receive an electromagnetic wave signal of the resonant frequency of the fifth resonant mode or of a frequency close to the resonant frequency of the fifth resonant mode.

The specific structure and adjustment manner of the third frequency-tuning circuit T3 are not limited in the disclosure.

In another implementation, the third frequency-tuning circuit T3 includes but is not limited to a variable capacitor. By means of adjustment of a capacitance value of the variable capacitor, the frequency-tuning parameter(s) of the third frequency-tuning circuit T3 can be adjusted, to adjust the impedance of the portion of the second radiator 21 between the first frequency-tuning point B and the third coupling end H3, so that the resonant frequency of the fifth resonant mode is adjusted.

The position of the second frequency-tuning point D is the position of the first coupling point C' when the first coupling point C' is close to the third coupling end H3. Therefore, the second frequency-tuning point D and the third coupling end H3 define a second coupling segment R2 therebetween. The second coupling segment R2 is coupled to the third radiator 31 through the second gap 102.

As mentioned above, by means of the frequency-tuning circuits and adjustment of parameters of the frequency-tuning circuits, the first antenna element 10 can cover an NMB and a UHB, the second antenna element 20 can cover an LB, and the third antenna element 30 can cover the MHB and the UHB, and thus the antenna module 100*a* can cover the LB, the MHB, and the UHB, thereby enhancing communication functions. The multiplexing of the radiators of the antenna elements can reduce the overall size of the antenna module 100*a*, thereby promoting the overall miniaturization.

Optionally, the structure of the third antenna element 30 is similar to that of the first antenna element 10.

Figure 22:
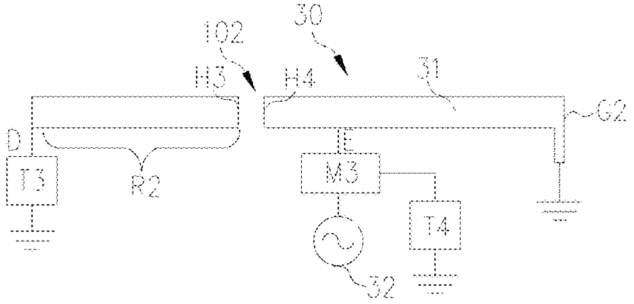
FIG. 22 is an equivalent circuit diagram of a third antenna element provided in FIG. 8.

Referring to FIG. 8 and FIG. 22, FIG. 22 is an equivalent circuit diagram of the third antenna element 30. The effect of the capacitive coupling between the third antenna element 30 and the second antenna element 20 is similar to the effect of the capacitive coupling between the first antenna element 10 and the second antenna element 20. Therefore, when the antenna module 100*a* operates, the third excitation signal generated by the third signal source 32 can be coupled to the second radiator 21 through the third radiator 31. In other words, when the third antenna element 30 operates, not only the third radiator 31 can be used to transmit/receive an electromagnetic wave signal, but also the second radiator 21 of the second antenna element 20 can be used to transmit/receive an electromagnetic wave signal, so that an operating bandwidth of the third antenna element 30 can be increased without an additional radiator(s).

For adjustment of a resonant frequency of the sixth resonant mode e, a resonant frequency of the seventh resonant mode f, a resonant frequency of the eighth resonant mode g, and a resonant frequency of the ninth resonant mode h, reference can be made to the adjustment of the resonant frequency of the first resonant mode a, the resonant frequency of the second resonant mode b, the resonant frequency of the third resonant mode c, and the resonant frequency of the fourth resonant mode d, which will not be repeated here.

When the antenna module 100*a* operates in multiple modes, ultra-wideband CA and the dual connection between the 4G radio access network and the 5G-NR (EN-DC) can be realized.

Since the first antenna element 10 can transmit/received the MHB and the UHB, the second antenna element 20 can transmit/receive the LB, and the third antenna element 30 can transmit/receive the MHB and the UHB, the first antenna element 10 and the second antenna element 20 are isolated from each other through bands, and the second antenna element 20 and the third antenna element 30 are isolated from each other through bands, to avoid mutual interference of signals. The first antenna element 10 and the third antenna element 30 are isolated from each other through physical spacing to avoid mutual interference of signals, which facilitates control of the antenna module 100*a* to transmit/receive an electromagnetic wave signal of a required band.

In addition, the first antenna element 10 and the third antenna element 30 can be arranged in different orientations or positions of the electronic device 1000 to facilitate switching between the first antenna element 10 and the third antenna element 30 in different scenarios. For example, it may be switched between the first antenna element 10 and the third antenna element 30 when the electronic device 1000 switches between a landscape mode and a portrait mode, it may be switched to the third antenna element 30 when the first antenna element 10 is blocked, and it may be switched to the first antenna element 10 when the third antenna element 30 is blocked, so that relatively good transmission/reception of an electromagnetic wave signal of the MHB and an electromagnetic wave signal of the UHB in different scenarios can be realized.

Furthermore, the antenna module 100*a* provided in the implementations of the disclosure not only can transmit/receive antenna signals but also has a function of sensing proximity. In the following, take that the first antenna element 10 and the second antenna element 20 serve as proximity electrodes as an example for illustration.

Figure 23:
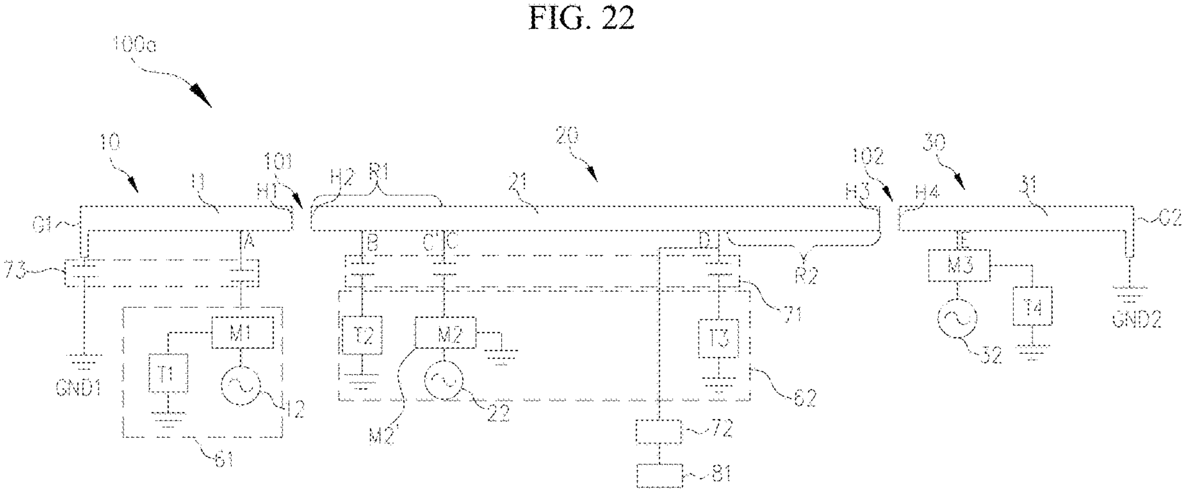
FIG. 23 is a schematic circuit diagram of a third type of antenna module provided in implementations of the disclosure.

Referring to FIG. 23, the second signal source 22 and the second frequency-selection filter circuit M2 form a second RF front-end unit 62. The second antenna element 20 further includes a first isolator 71, a second isolator 72, and a first proximity sensor 81.

The first isolator 71 is arranged between the second radiator 21 and the second RF front-end unit 62. The first isolator 71 is configured to isolate a first induction signal generated when an object to-be-detected is close to the second radiator 21 and to allow the second electromagnetic wave signal to pass.

One end of the second isolator 72 is electrically connected to the second radiator 21. The second isolator 72 is configured to isolate the second electromagnetic wave signal and to allow the first induction signal to pass.

The first proximity sensor 81 is electrically connected to the other end of the second isolator 72. The first proximity sensor 81 is configured to sense a magnitude of the first induction signal. In the implementation, the object to-be-detected is a human body, and there are charges on surfaces of the object to-be-detected. When the object to-be-detected is close to the second radiator 21, charges on surfaces of the second radiator 21 change, resulting in a change in the first induction signal.

In some implementations, the first isolator 71 includes a blocking capacitor, and the second isolator 72 includes a blocking inductor. When the object to-be-detected is close to the second radiator 21, the first induction signal generated by the second radiator 21 is a direct current (DC) signal. The electromagnetic wave signal is an alternating current (AC) signal. With the first isolator 71 arranged between the second radiator 21 and the second RF front-end unit 62, the first induction signal is prevented from flowing from the second radiator 21 to the second RF front-end unit 62, such that signal transmission/reception of the second antenna element 20 is not affected. The first isolator 71 makes the second radiator 21 be in a "floating" state relative to the DC signal to sense a capacitance change caused by the proximity of the human body. With the second isolator 72 arranged between the first proximity sensor 81 and the second radiator 21, the electromagnetic wave signal is prevented from flowing from the second radiator 21 to the first proximity sensor 81, thereby improving an efficiency of sensing the first induction signal by the first proximity sensor 81. The specific structure of the first proximity sensor 81 is not limited in the disclosure and includes but is not limited to a sensor configured to sense a change in capacitance or inductance.

The antenna system 100 further includes a third controller 805, where the third controller 805 is electrically connected to the first proximity sensor 81. The third controller 805 is configured to adjust power of at least one of the first antenna element 10, the second antenna element 20, or the third antenna element 30 according to a proximity of the object to-be-detected to the second radiator 21 detected by the first proximity sensor 81. The third controller 805 is configured to determine the proximity of the object to-be-detected to the second radiator 21 according to the magnitude of the first induction signal, to reduce the power of the LB antenna element 700 of the antenna module 100*a* to which the object to-be-detected is close, and to increase the power of the LB antenna element 700 of the antenna module 100*a* to which no object to-be-detected is close.

In some implementations, the third controller 805 is further configured to reduce the power of the second antenna element 20 (which is the LB antenna element 700) when a distance between the object to-be-detected and the second radiator 21 is less than a preset threshold, to reduce a specific absorption rate (SAR) of the object to-be-detected to the electromagnetic wave. The preset threshold can, for example, range from 0 cm to 5 cm. The specific value of power reduction of the second antenna element 20 is not limited in the disclosure, for example, the power of the second antenna element can be reduced to 80%, 60%, 50% of a rated power, or even the second antenna element 20 is switched off. The third controller 805 is further configured to increase the power of the second antenna element 20 when the distance between the object to-be-detected and the second radiator 21 is greater than the preset threshold, to improve the communication quality of the antenna module 100*a*. The specific value of power increase of the second antenna element 20 is not limited, for example, the power of the second antenna element 20 can be restored to the rated power.

In the implementations of the disclosure, the first controller 801, the second controller 803, and the third controller 805 in the disclosure can be located on the main printed circuit board 200 of the electronic device 1000. In other implementations, the first controller 801, the second controller 803, and the third controller 805 each can be a separately packaged chip, or can be integrated into one chip.

Referring to FIG. 23, the first signal source 12 and the first frequency-selection filter circuit M1 form the first RF front-end unit 61. The first antenna element 10 further includes a third isolator 73. The third isolator 73 is located between the first radiator 11 and the first RF front-end unit 61 and between the first ground end G1 and the first reference ground GND1, and configured to isolate a second induction signal generated when the object to-be-detected is close to the first radiator 11 and allow the first electromagnetic wave signal to pass. In some implementations, the third isolator 73 includes a blocking capacitor, and is configured to make the first radiator 11 in a "floating" state relative to the DC signal.

Referring to FIG. 23, in the first possible implementation, the second induction signal is configured to enable the second radiator 21 to generate an induction sub-signal through coupling between the first radiator 11 and the second radiator 21, and the first proximity sensor 81 is further configured to sense a magnitude of the induction sub-signal.

In the implementation, both the first radiator 11 and the second radiator 21 serve as sensing electrodes for detecting proximity of the object to-be-detected, and a proximity-sensing path of the first radiator 11 is from the first radiator 11, to the second radiator 21, and then to the first proximity sensor 81. In other words, when the object to-be-detected is close to the first radiator 11, the first radiator 11 generates the second induction signal, and the second induction signal enables the second radiator 21 to generate the induction sub-signal through coupling, so that the first proximity sensor 81 can also sense proximity of the object to-be-detected to the first radiator 11. There is no need to use two proximity sensors 81, and the coupling between the first radiator 11 and the second radiator 21 and the first proximity sensor 81 are fully utilized, so that the first radiator 11 and the second radiator 21 can be multiplexed in the case of proximity detection, increasing the utilization rate of devices, reducing the number of devices, and further promoting the integration and miniaturization of the electronic device 1000.

The controller is further configured to determine proximity of the subject to-be-detected to the first radiator 11 of each antenna module 100*a* according to the magnitude of the induction sub-signal, to reduce the power of the MHB+UHB antenna element 600 of the antenna module 100*a* to which the subject to-be-detected is close, and to increase the power of the MHB+UHB antenna element 600 of the antenna module 100*a* to which no subject to-be-detected is close.

Figure 24:
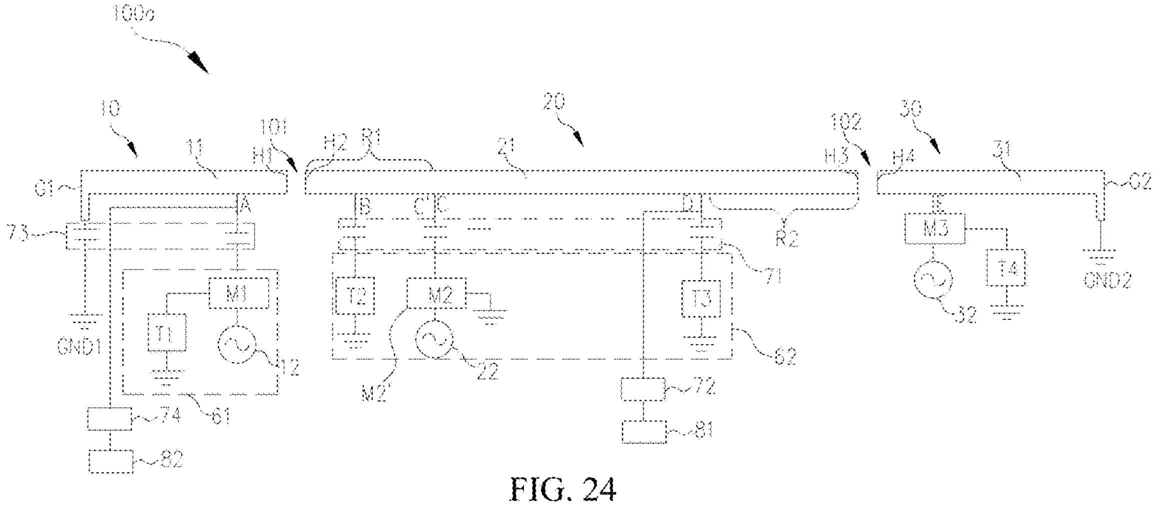
FIG. 24 is a schematic circuit diagram of a fourth type of antenna module provided in implementations of the disclosure.

Referring to FIG. 24, in the second possible implementation, the MHB+UHB antenna element 600 further includes a fourth isolator 74 and a second proximity sensor 82. One end of the fourth isolator 74 is electrically connected to the first radiator 11, the fourth isolator 74 is configured to isolate the first electromagnetic wave signal and allow the second induction signal to pass. In some implementations, the fourth isolator 74 includes a blocking capacitor.

Referring to FIG. 24, the second proximity sensor 82 is electrically connected to the other end of the fourth isolator 74 and is configured to sense the magnitude of the second induction signal. In some implementations, both the first radiator 11 and the second radiator 21 serve as sensing electrodes for detecting the proximity of the subject to-be-detected, and the proximity-sensing path of the first radiator 11 and a proximity-sensing path of the second radiator 21 are independent of each other, such that whether the subject to-be-detected is close to the first radiator 11 or the second radiator 21 can be accurately detected, and thus the proximity of the subject to-be-detected to the first radiator 11 or the second radiator 21 can be responded in time. In some implementations, when the subject to-be-detected is close to the first radiator 11, the second induction signal generated by the first radiator 11 is a DC signal. The electromagnetic wave signal is an AC signal. With the third isolator 73 between the first radiator 11 and the first RF front-end unit 61, the second induction signal is prevented from flowing to the first RF front-end unit 61 through the first radiator 11, and thus signal transmission/reception of the first antenna element 10 is not affected. With the fourth isolator 74 between the second proximity sensor 82 and the first radiator 11, the electromagnetic wave signal is prevented from flowing to the second proximity sensor 82 through the first radiator 11, improving an efficiency of sensing the second induction signal by the second proximity sensor 82.

In other implementations, the induction signal of the second radiator 21 can be transmitted to the second proximity sensor 82 through the coupling between the second radiator 21 and the first radiator 11.

The third controller 805 is further electrically connected to the second proximity sensor 82. The third controller 805 is further configured to determine the proximity of the subject to-be-detected to the first radiator 11 of each antenna module 100*a* according to the magnitude of the second induction signal, to reduce the power of the MHB+UHB antenna element 600 of the antenna module 100*a* to which the subject to-be-detected is close, and to increase the power of the MHB+UHB antenna element 600 of the antenna module 100*a* to which no subject to-be-detected is close.

Figure 25:
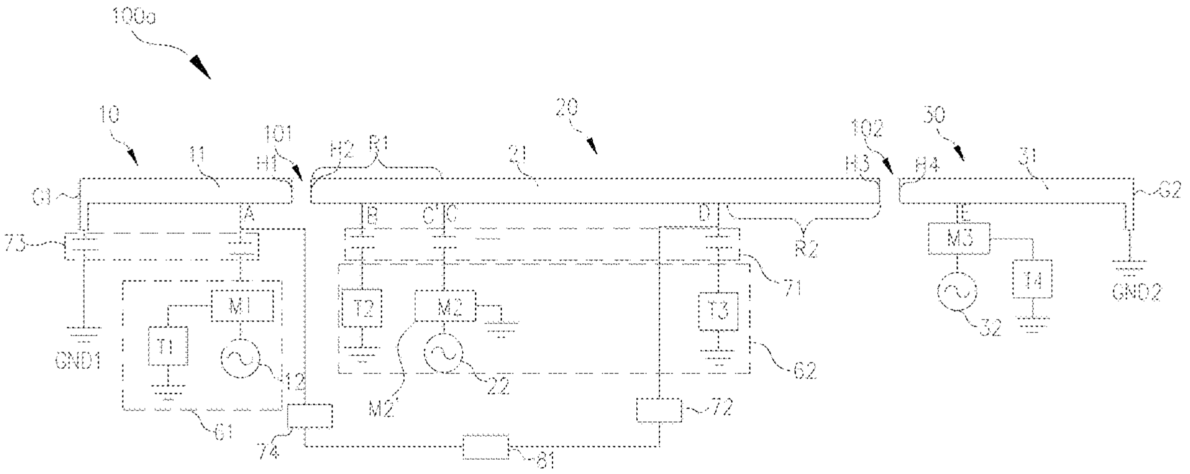
FIG. 25 is a schematic circuit diagram of a fifth type of antenna module provided in implementations of the disclosure.

Referring to FIG. 25, in the third possible implementation, the other end of the fourth isolator 74 is electrically connected to the first proximity sensor 81. When the first radiator 11 and the second radiator 21 are in capacitive coupling, a coupling induction signal is generated. The first proximity sensor 81 is further configured to sense a change in the coupling induction signal when the object to-be-detected approaches the first radiator 11 and/or the second radiator 21.

In some implementations, when the first radiator 11 and the second radiator 21 are coupled, a constant electric field is generated, which manifests as a stable coupling induction signal. When the human body approaches the constant electric field, the electric field changes, which manifests as a change in the coupling induction signal. The proximity of the human body can be detected according to the change in the coupling induction signal.

In the implementation, the first radiator 11 and the second radiator 21 both serve as sensing electrodes, and can accurately detect proximity of the human body to a region corresponding to the first radiator 11, proximity of the human body to a region corresponding to the second radiator 21, and proximity of the human body to the first gap 101. There is no need to use two proximity sensors 81, and the coupling between the first radiator 11 and the second radiator 21 and the first proximity sensor 81 are fully utilized, so that the first radiator 41 and the second radiator 21 can be multiplexed in the case of proximity detection, which increases the utilization rate of devices, reduces the number of devices, and further promotes the integration and miniaturization of the electronic device 1000.

The specific structure of the second proximity sensor 82 is not specifically limited in the disclosure. The proximity sensor 82 includes but is not limited to a sensor for sensing a change in capacitance or inductance.

The third controller 805 is further configured to determine proximity of the object to-be-detected to the first radiator 11 of each antenna module 100*a* according to the magnitude of the coupling induction signal, to reduce the power of the MHB+UHB antenna element 600 of the antenna module 100*a* to which the object to-be-detected is close, and to increase the power of the MHB+UHB antenna element 600 of the antenna module 100*a* to which no object to-be-detected is close.

Since the first antenna element 10 and the third antenna element 30 both transmit/receive an electromagnetic signal of the MHB and the UHB, the third controller 805 is further configured to reduce the power of the first antenna element 10 and increase the power of the third antenna element 30 when the object to-be-detected is close to the first radiator 11, thereby reducing the SAR of the object to-be-detected to an electromagnetic wave and ensuring the communication quality of the antenna module 100*a*. The third controller 805 is further configured to reduce the power of the third antenna element 30 and increase the power of the first antenna element 10 when the object to-be-detected is close to the third radiator 31, thereby reducing the SAR of the object to-be-detected to electromagnetic wave and ensuring the communication quality of the antenna module 100*a*.

Figure 26:
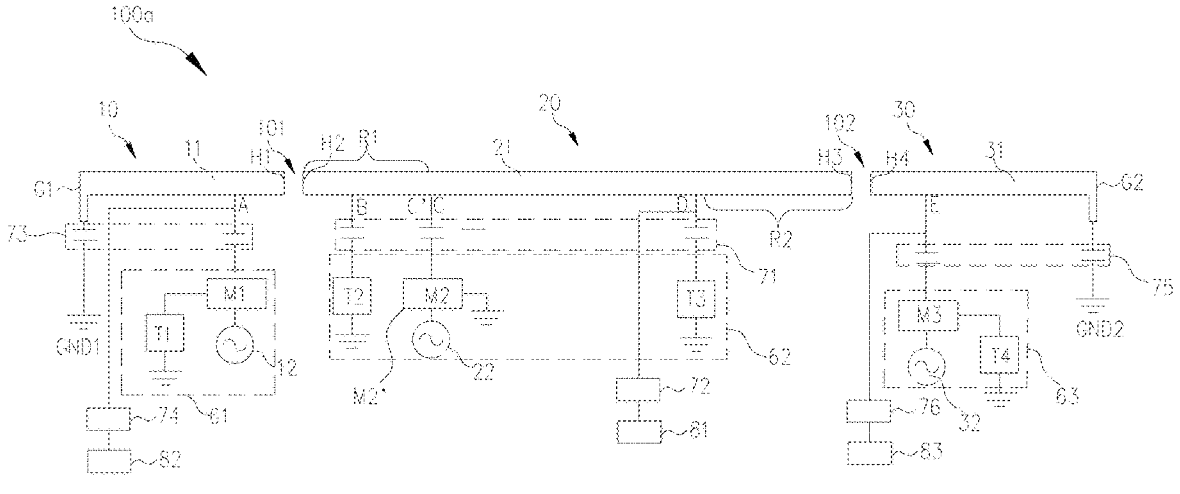
FIG. 26 is a schematic circuit diagram of a sixth type of antenna module provided in implementations of the disclosure.

As illustrated in FIG. 26, the third antenna element 30 may further include a fifth isolator 75. The third signal source 32 and the third frequency-selection filter circuit M3 form a third RF front-end unit 63. The reference ground 40 connected to the first RF front-end unit 61, the reference ground connected to the second RF front-end unit 62, and a reference ground connected to the third RF front-end unit 63 are the same reference ground.

The antenna module 100*a* may further include a sixth isolator 76 and a third proximity sensor 83. The fifth isolator 75 is located between the third radiator 31 and the third RF front-end unit 63 and between the second ground end G2 and the second reference ground GND2, to isolate the third induction signal generated when the subject to-be-detected is close to the third radiator 31 and allow the third electromagnetic wave signal to pass. One end of the sixth isolator 76 is electrically connected between the third radiator 31 and the fifth isolator 75 to isolate the third electromagnetic wave signal and allow the third induction signal to pass. The third proximity sensor 83 is electrically connected to the other end of the sixth isolator 76 and configured to sense a magnitude of the third induction signal.

In some implementations, the fifth isolator 75 includes a blocking capacitor, and the sixth isolator 76 includes a blocking inductor. When the subject to-be-detected is close to the third radiator 31, the third induction signal generated by the third radiator 31 is a DC signal. The electromagnetic wave signal is an AC signal. With the fifth isolator 75 between the third radiator 31 and the third RF front-end unit 63, the third induction signal is prevented from flowing to the third RF front-end unit 63 through the third radiator 31, and thus signal transmission/reception of the third antenna element 30 is not affected. With the sixth isolator 76 between the third proximity sensor 83 and the third radiator 31, the electromagnetic wave signal is prevented from flowing to the third proximity sensor 83 through the third radiator 31, thereby improving an efficiency of sensing the third induction signal by the third proximity sensor 83.

The specific structure of the third proximity sensor 83 is not specifically limited in the disclosure. The third proximity sensor 83 includes but is not limited to a sensor for sensing a change in capacitance or inductance.

Thus, any one or more of the first radiator 11, the second radiator 21, and the third radiator 31 can serve as a sensing electrode for detecting proximity of the subject to-be-detected (e.g., human body).

It can be understood that when the third radiator 31 serves as a sensing electrode for sensing proximity of the human body, a specific sensing path of the third radiator 31 may be independent of the sensing path of the second radiator 21, or an induction signal is transmitted to the first proximity sensor 81 through the coupling between the first radiator 11 and the second radiator 21, or a coupling induction signal can be generated when the third radiator 31 is in capacitive coupling with the second radiator 21, and the coupling induction signal is then transmitted to the first proximity sensor 81. For the specific implementation, reference can be made to the implementation where the first radiator 11 serves as a sensing electrode, which will not be described here.

There is no specific limitation on a manner in which the antenna module 100*a* is installed at the housing 500 in the disclosure, and the manner in which the antenna module 100*a* is integrated at the housing 500 includes but is not limited to the following implementations.

In some implementations, the frame 505 of the housing 500 includes multiple side edges that are sequentially connected end to end. In some implementations, the multiple side edges include a first side edge 51, a second side edge 52, a third side edge 53, and a fourth side edge 54 that are sequentially connected. The first side edge 51 is opposite to the third side edge 53, and the second side edge 52 is opposite to the fourth side edge 54. The first side edge 51 is longer than the second side edge 52.

Two adjacent side edges define a corner portion at a joint between the two adjacent side edges. A joint between the first side edge 51 and the fourth side edge 54 is a first corner portion 510. A joint between the first side edge 51 and the second side edge 52 is a second corner portion 520. A joint between the second side edge 52 and the third side edge 53 is a third corner portion 530. A joint between the third side edge 53 and the fourth side edge 54 is a fourth corner portion 540.

Figure 27:
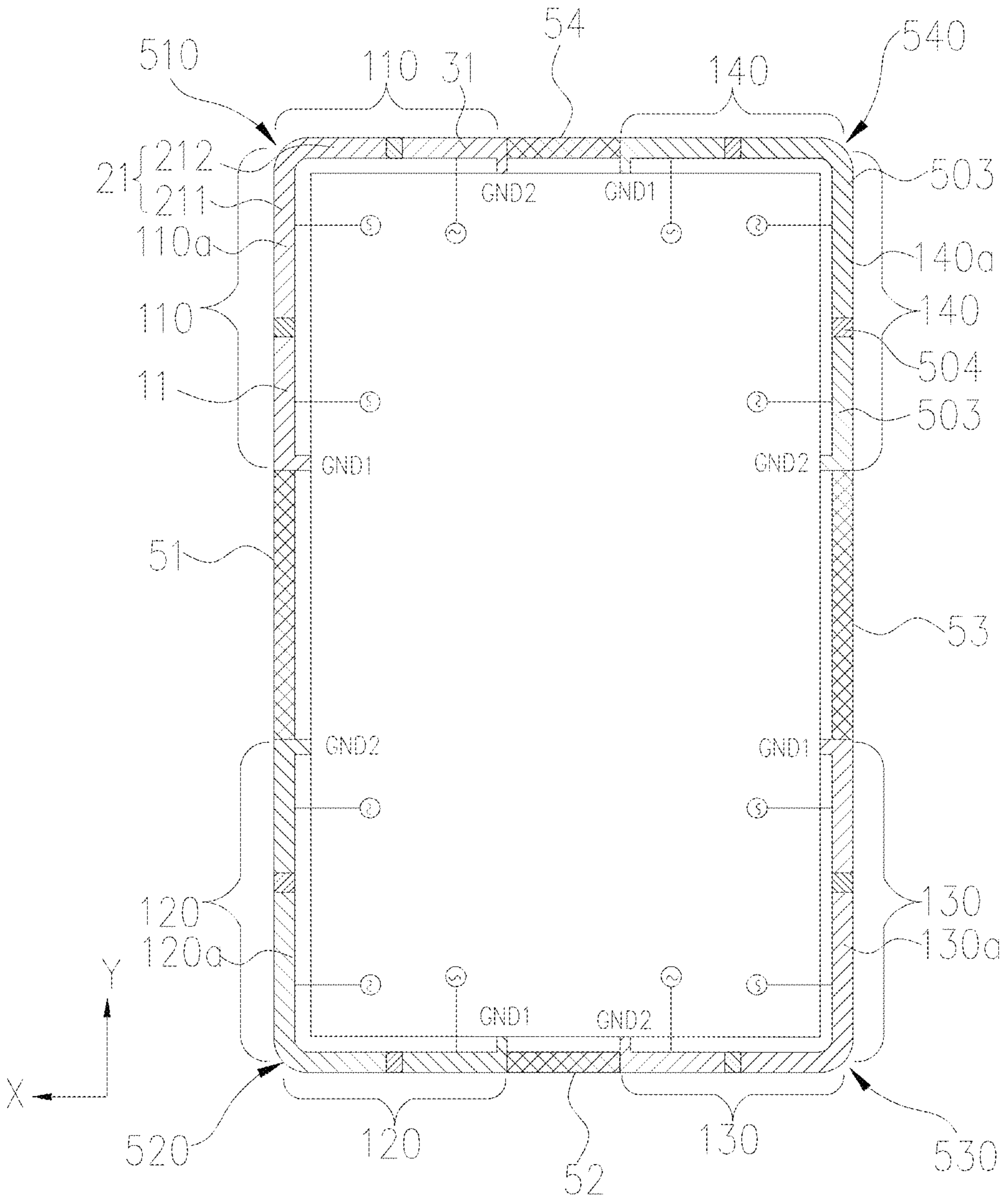
FIG. 27 is a schematic structural view of a first type of antenna system provided in implementations of the disclosure.

In some implementations, the first corner portion 510, the second corner portion 520, the third corner portion 530, and the fourth corner portion 540 are all located on an outer surface of the frame 505. As illustrated in FIG. 27, the first corner portion 510 may be an upper left corner of the housing 500, the second corner portion 520 may be a lower left corner of the housing 500, the third corner portion 530 may be a lower right corner of the housing 500, and the fourth corner portion 540 may be an upper right corner of the housing 500.

Optionally, at least one antenna module 100*a* is located at or close to a corner portion. The case where the antenna module 100*a* is located at or close to a corner portion includes that the radiator of the antenna module 100*a* is integrated into the frame 505 and located at the corner portion. In some implementations, part of the radiator of the antenna module 100*a* is located at one edge of the corner portion, and the other part of the radiator of the antenna module 100*a* is located at the other edge of the corner portion. The case where the antenna module 100*a* is located at or close to a corner portion may further include that the radiator of the antenna module 100*a* is located in the housing 500 and close to the corner portion. In some implementations, part of the radiator of the antenna module 100*a* is attached to an inner surface of one edge of the corner portion, and the other part of the radiator of the antenna module 100*a* is attached to an inner surface of the other edge of the corner portion.

In some implementations, the manner in which the radiator of the antenna module 100*a* is disposed at the housing 500 can include, but is not limited to, the following implementations.

Referring to FIG. 27, in one implementation, the radiator of the antenna module 100*a* is coated on an outer surface of the frame 505, an inner surface of the frame 505, or at least partially embedded in the frame 505 to be integrated into a part of the frame 505. Optionally, the frame 505 includes multiple metal segments 503 and insulation segments 504, where each insulation segment 504 is located between two adjacent metal segments 503. At least one of the multiple metal segments 503 serves as the radiator of the antenna module 100*a*.

Figure 28:
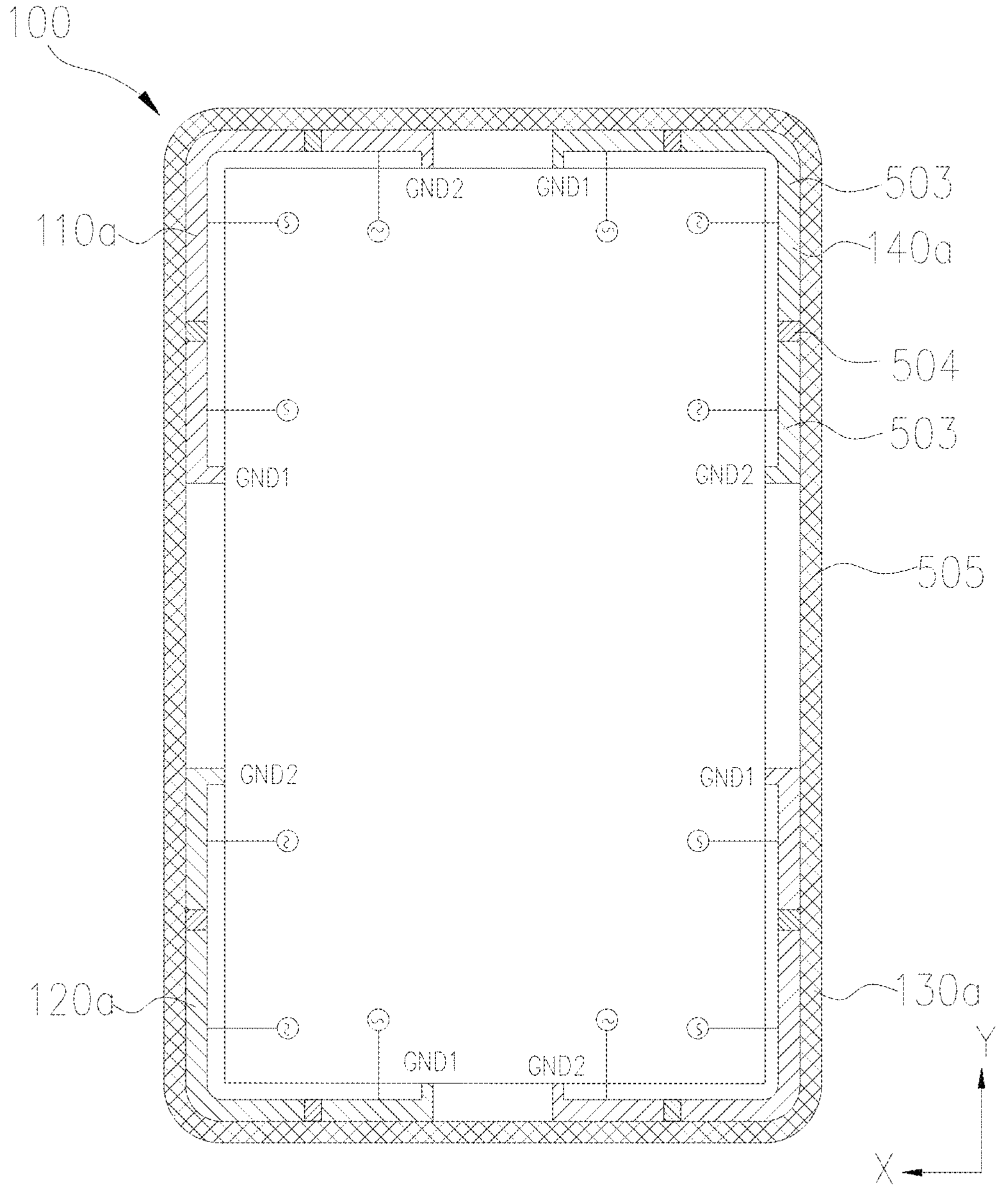
FIG. 28 is a schematic structural view of a second type of antenna system provided in implementations of the disclosure.

Referring to FIG. 28, in another implementation, the antenna module 100*a* is located in the housing 500. The radiator of the antenna module 100*a* can be formed on a flexible circuit board and attached to the inner surface of the frame 505 or other locations of the frame 505.

Optionally, among the four antenna modules 100*a*, one antenna module 100*a* is located at or close to a corner portion, and the other three antenna modules 100*a* are located at or close to three side edges. Alternatively, among the four antenna modules 100*a*, two antenna modules 100*a* are respectively located at or close to two corner portions, and the other two antenna modules 100*a* are respectively located at or close to two side edges. Alternatively, among the four antenna modules 100*a*, three antenna modules 100*a* are respectively located at or close to three corner portions, and the other antenna module 100*a* is located at or close to one side edge. Alternatively, the four antenna modules 100*a* are respectively located at or close to four corners or four side edges.

Optionally, as illustrated in FIG. 27, the first antenna module 110 is located at or close to the first corner portion 510, the second antenna module 120 is located at or close to the second corner portion 520, the third antenna module 130 is located at or close to the third corner portion 530, and the fourth antenna module 140 is located at or close to the fourth corner portion 540. The first radiator 11 of the first antenna element 10 of the first antenna module 110 is located at or close to the first side edge 51, the third radiator 31 of the third antenna element 30 of the first antenna module 110 is located at or close to the fourth side edge 54, and a first portion 211 of the second radiator 21 of the second antenna element 20 of the first antenna module 110 is located at or close to the first side edge 51, and a second portion 212 of the second radiator 21 of the second antenna element 20 of the first antenna module 110 is located at or close to the fourth side edge 54. The length of the first portion 211 is greater than or equal to the length of the second portion 212, or the length of the first portion 211 is less than the length of the second portion 212.

Generally, the electronic device 1000 is held by one hand for use. When the electronic device 1000 is held by one hand, two side edges and one or two corner portions of the electronic device 100 may be blocked, and some corner portions in the four corner portions are not blocked. The antenna modules 100*a* located at or close to unblocked corner portions can transmit/receive antenna signals, and thus it can be ensured that even if some antenna modules 100*a* are blocked, transmission/reception of antenna signals of the electronic device 1000 are not be affected. In addition, the antenna modules 100*a* are located at the four corner portions, and the antenna modules 100*a* are arranged along a periphery of the housing 500 of the electronic device 1000, allowing the antenna modules 100*a* to transmit/receive antenna signals in a spherical range around a periphery of the electronic device 1000, thereby improving the efficiency of transmission/reception of antenna signals. Furthermore, when the antenna module 100*a* is used to detect proximity of the object to-be-detected (e.g., human body), by means of arranging the antenna modules 100*a* at the four corners, proximity of the human body in all orientations around the periphery of the electronic device 1000 can be detected, improving the accuracy of detection of proximity of the human body.

When the electronic device 1000 is held horizontally by both hands of an operator, all the four corners are blocked, and the first side edge 51 and the third side edge 53 are not blocked. Thus, by means of arranging at least one antenna module 100*a* at or close to the first side edge 51 and/or the third side edge 53, the electronic device 1000 can still have relatively high antenna-signal transmission/reception performance when the electronic device 1000 is held horizontally by both hands of the operator.

The above are some implementations of the disclosure. It needs to be noted that for ordinary skilled persons in the art, on the premise of not departing from the principle of the disclosure, various modifications and improvements can be made, and such modifications and improvements are also considered within the scope of protection of the disclosure.

What is claimed is:

1. An antenna system, comprising:

a plurality of antenna modules, the plurality of antenna modules comprising:

a first antenna module comprising a first lower band (LB) antenna element;

a second antenna module comprising a second LB antenna element;

a third antenna module comprising a third LB antenna element; and a fourth antenna module comprising a fourth LB antenna element, wherein respective ones of the first LB antenna element, the second LB antenna element, the third LB antenna element, and the fourth LB antenna element are configured to support at least one of a long term evolution-LB (LTE-LB) or a new radio-LB (NR-LB), and wherein the LTE-LB ranges from 0 to 1000 megahertz (MHz), and the NR-LB ranges from 0 to 1000 MHz; and a first controller configured to control at least one of the first LB antenna element, the second LB antenna element, the third LB antenna element, or the fourth LB antenna element to support the LTE-LB and control at least one other among the first LB antenna element, the second LB antenna element, the third LB antenna element, and the fourth LB antenna element to support the NR-LB, to realize LTE-NR double connect (EN-DC) in an LB, wherein (i) at least one of the first antenna module, the second antenna module, the third antenna module, or the fourth antenna module further comprises: at least one middle high band (NMB)+ultra high band (UHB) antenna element and (ii) the at least one MHB+UHB antenna element is configured to support (a) an LTE MHB and an LTE UHB or (b) an NR MHB and an NR UHB.

2. The antenna system of claim 1, wherein the first controller is configured to control two of the first LB antenna element, the second LB antenna element, the third LB antenna element, and the fourth LB antenna element to support the LTE-LB, and control the other among the first LB antenna element, the second LB antenna element, the third LB antenna element, and the fourth LB antenna element to support the NR-LB.

3. The antenna system of claim 1, wherein a combined bandwidth of bands supported by the first LB antenna element, the second LB antenna element, the third LB antenna element, and the fourth LB antenna element is greater than or equal to 350 MHz.

4. The antenna system of claim 1, wherein a combination of bands supported by the first LB antenna element, the second LB antenna element, the third LB antenna element, and the fourth LB antenna element ranges from 617 MHz to 960 MHz.

5. The antenna system of claim 1, wherein at least one of the first LB antenna element, the second LB antenna element, the third LB antenna element, or the fourth LB antenna element is provided with a frequency-tuning circuit, wherein the frequency-tuning circuit is configured to make an LB antenna element provided with the frequency-tuning circuit support a band ranging from 617 MHz to 960 MHz.

6. The antenna system of claim 1, wherein the LTE-LB comprises at least one of a B20 band or a B28 band, and the NR-LB comprises at least one of an N28 band, an N8 band, or an N5 band.

7. The antenna system of claim 1, wherein (i) a radiator of the MHB+UHB antenna element is in capacitive coupling with a radiator of an LB antenna element and at least part of bands transmitted and received by the MHB+UHB antenna element is formed by the capacitive coupling, (ii) a frequency transmitted and received by the MHB+UHB antenna element is greater than 1000 MHz, and (iii) the LB antenna element is at least one of the first LB antenna element, the second LB antenna element, the third LB antenna element, or the fourth LB antenna element.

8. The antenna system of claim 7, wherein at least one of the antenna modules comprises two MHB+UHB antenna elements, wherein the two MHB+UHB antenna elements are arranged at two opposite sides of the LB antenna element, respectively, and radiators of the two MHB+UHB antenna elements each are in capacitive coupling with the radiator of the LB antenna element; and the antenna system further comprises a second controller, wherein the second controller is electrically connected to a plurality of MHB+UHB antenna elements, and the second controller is configured to control at least one of the plurality of MHB+UHB antenna elements to operate.

9. The antenna system of claim 7, wherein the MHB+UHB antenna element comprises a first radiator, a first signal source, and a first frequency-selection filter circuit, wherein the first radiator comprises a first ground end, a first feeding point, and a first coupling end, wherein the first feeding point is arranged between the first ground end and the first coupling end; the first ground end is grounded, an output end of the first signal source is electrically connected to a first end of the first frequency-selection filter circuit, and a second end of the first frequency-selection filter circuit is electrically connected to the first feeding point; and the LB antenna element comprises a second radiator, a second signal source, and a second frequency-selection filter circuit, wherein the second radiator comprises a second coupling end, a second feeding point, and a third coupling end, wherein the second feeding point is arranged between the second coupling end and the third coupling end, a first gap is defined between the second coupling end and the first coupling end, and the second coupling end is coupled with the first coupling end through the first gap, an output end of the second signal source is electrically connected to a first end of the second frequency-selection filter circuit, and a second end of the second frequency-selection filter circuit is electrically connected to the second feeding point.

10. The antenna system of claim 9, wherein the MHB+UHB antenna element further comprises a first frequency-tuning circuit, wherein one end of the first frequency-tuning circuit is electrically connected to the first frequency-selection filter circuit, and another end of the first frequency-tuning circuit is grounded; and/or one end of the first frequency-tuning circuit is electrically connected between the first ground end and the first feeding point;

the LB antenna element further comprises a second frequency-tuning circuit, and the second radiator further comprises a first frequency-tuning point arranged between the second coupling end and the second feeding point, wherein the second frequency-tuning circuit is electrically connected to the first frequency-tuning point, and one end of the second frequency-tuning circuit away from the first frequency-tuning point is grounded; and the second radiator further comprises a second frequency-tuning point arranged between the second feeding point and the third coupling end, and the LB antenna element further comprises a third frequency-tuning circuit, wherein one end of the third frequency-tuning circuit is electrically connected to the second frequency-tuning point and/or the second frequency-tuning circuit, and another end of the third frequency-tuning circuit is grounded.

11. The antenna system of claim 10, wherein the MHB+UHB antenna element is configured to generate a first resonant mode when a portion of the MHB+UHB antenna element between the first ground end and the first coupling end operates in a fundamental mode;

a portion of the second radiator between the second feeding point and the second coupling end is configured to be coupled to the first radiator, and the MHB+UHB antenna element is configured to generate a second resonant mode when the portion of the MHB+UHB antenna element between the second feeding point and the second coupling end operates in the fundamental mode;

the MHB+UHB antenna element is configured to generate a third resonant mode when a portion of the MHB+UHB antenna element between the first feeding point and the first coupling end operates in the fundamental mode, and the second frequency-tuning circuit is configured to adjust a resonant frequency of the second resonant mode and a resonant frequency of the third resonant mode;

the MHB+UHB antenna element is configured to generate a fourth resonant mode when the portion of the MHB+UHB antenna element between the first ground end and the first coupling end operates in a third-order mode, a resonant frequency of the first resonant mode, the resonant frequency of the second resonant mode, the resonant frequency of the third resonant mode, and a resonant frequency of the fourth resonant mode increase sequentially; and the first frequency-tuning circuit is configured to adjust the resonant frequency of the first resonant mode, the resonant frequency of the third resonant mode, and the resonant frequency of the fourth resonant mode; and the LB antenna element is configured to generate a fifth resonant mode when a portion of the LB antenna element between the first frequency-tuning point and the third coupling end operates in the fundamental mode, and the third frequency-tuning circuit is configured to adjust a resonant frequency of the fifth resonant mode.

12. The antenna system of claim 9, wherein the LB antenna element further comprises a first isolator, a second isolator, and a first proximity sensor, wherein one end of the first isolator is electrically connected to the second radiator and another end of the first isolator is electrically connected to the second frequency-selection filter circuit, the first isolator is configured to isolate a first induction signal generated when a subject to-be-detected is close to the second radiator, and allow an electromagnetic wave signal transmitted and received by the second radiator to pass; one end of the second isolator is electrically connected to the second radiator, and the second isolator is configured to isolate the electromagnetic wave signal transmitted and received by the second radiator and allow the first induction signal to pass; and the first proximity sensor is electrically connected to another end of the second isolator and configured to sense a magnitude of the first induction signal.

13. The antenna system of claim 12, wherein the MHB+UHB antenna element further comprises a third isolator, wherein the third isolator is electrically connected between the first ground end and a reference ground and electrically connected between the first feeding point and the first frequency-selection filter circuit, and the third isolator is configured to isolate a second induction signal generated when the subject to-be-detected is close to the first radiator, and allow an electromagnetic wave signal transmitted and received by the first radiator to pass.

14. The antenna system of claim 13, wherein the second induction signal is used to make the second radiator generate an induction sub-signal through a coupling between the first radiator and the second radiator, and the first proximity sensor is further configured to sense a magnitude of the induction sub-signal;

the MHB+UHB antenna element further comprises a fourth isolator, wherein one end of the fourth isolator is electrically connected to the first radiator and configured to isolate an electromagnetic wave signal transmitted and received by the first radiator and allow the second induction signal to pass, another end of the fourth isolator is electrically connected to the first proximity sensor, a coupling induction signal is generated when the first radiator is in capacitive coupling with the second radiator, and the first proximity sensor is further configured to sense a change in the coupling induction signal when the subject to-be-detected is close to the first radiator and/or the second radiator; or the MHB+UHB antenna element further comprises the fourth isolator and a second proximity sensor, wherein one end of the fourth isolator is electrically connected to the first radiator and configured to isolate the electromagnetic wave signal transmitted and received by the first radiator and allow the second induction signal to pass, another end of the fourth isolator is electrically connected with the second proximity sensor, and the second proximity sensor is configured to sense a magnitude of the second induction signal.

15. The antenna system of claim 14, further comprising a third controller, wherein the third controller is electrically connected to the first proximity sensor, and the third controller is configured to determine proximity of the subject to-be-detected to the second radiator of each of the plurality of antenna modules according to the magnitude of the first induction signal, to reduce a power of an LB antenna element of an antenna module to which the subject to-be-detected is close, and to increase a power of an LB antenna element of an antenna module to which no subject to-be-detected is close; or the third controller is further electrically connected to the second proximity sensor, and the third controller is further configured to determine proximity of the subject to-be-detected to the first radiator of each of the plurality of antenna modules according to the magnitude of the second induction signal, the magnitude of the coupling induction signal, or the magnitude of the induction sub-signal, to reduce a power of an MHB+UHB antenna element of an antenna module to which the subject to-be-detected is close, and to increase a power of an MHB+UHB antenna element of an antenna module to which no subject to-be-detected is close.

16. An antenna system, comprising:

a plurality of antenna modules, the plurality of antenna modules comprising:

a first antenna module comprising a first lower band (LB) antenna element;

a second antenna module comprising a second LB antenna element;

a third antenna module comprising a third LB antenna element; and a fourth antenna module comprising a fourth LB antenna element, wherein respective ones of the first LB antenna element, the second LB antenna element, the third LB antenna element, and the fourth LB antenna element are configured to support at least one of a long term evolution-LB (LTE-LB) or a new radio-LB (NR-LB), and wherein the LTE-LB ranges from 0 to 1000 megahertz (MHz), and the NR-LB ranges from 0 to 1000 MHz; and a first controller configured to control at least one of the first LB antenna element, the second LB antenna element, the third LB antenna element, or the fourth LB antenna element to support the LTE-LB and control at least one other among the first LB antenna element, the second LB antenna element, the third LB antenna element, and the fourth LB antenna element to support the NR-LB, to realize LTE-NR double connect (EN-DC) in an LB, wherein the first LB antenna element, the second LB antenna element, the third LB antenna element, and the fourth LB antenna element are classified into a first LB-antenna-element group and a second LB-antenna-element group, or classified into a third LB-antenna-element group and a fourth LB-antenna-element group, wherein at least one LB antenna element in the first LB-antenna-element group is different from an LB antenna element in the third LB-antenna-element group; and the first controller is electrically connected to the first LB antenna element, the second LB antenna element, the third LB antenna element, and the fourth LB antenna element, the first controller is configured to control, in a first time period, the first LB-antenna-element group to support the LTE-LB and the second LB-antenna-element group to support the NR-LB, and the first controller is further configured to control, in a second time period, the third LB-antenna-element group to support the LTE-LB, and the fourth LB-antenna-element group to support the NR-LB.

17. An electronic device, comprising:

a housing; and an antenna system at least partially integrated at the housing or disposed in the housing, and comprising:

a plurality of antenna modules, the plurality of antenna modules comprising:

a first antenna module comprising a first lower band (LB) antenna element;

a second antenna module comprising a second LB antenna element;

a third antenna module comprising a third LB antenna element; and a fourth antenna module comprising a fourth LB antenna element, wherein respective ones of the first LB antenna element, the second LB antenna element, the third LB antenna element, and the fourth LB antenna element are configured to support at least one of a long term evolution-LB (LTE-LB) or a new radio-LB (NR-LB), and wherein the LTE-LB ranges from 0 to 1000 megahertz (MHz), and the NR-LB ranges from 0 to 1000 MHz; and a first controller configured to control at least one of the first LB antenna element, the second LB antenna element, the third LB antenna element, or the fourth LB antenna element to support the LTE-LB and control at least one other among the first LB antenna element, the second LB antenna element, the third LB antenna element, and the fourth LB antenna element to support the NR-LB, to realize LTE-NR double connect (EN-DC) in an LB, wherein (i) at least one of the first antenna module, the second antenna module, the third antenna module, or the fourth antenna module further comprises: at least one middle high band (MHB)+ultra high band (UHB) antenna element and (ii) the at least one MHB+UHB antenna element is configured to support (a) an LTE MHB and an LTE UHB or (b) an NR MHB and an NR UHB.

18. The electronic device of claim 17, wherein the housing comprises a plurality of side edges that are sequentially connected end-to-end, two adjacent side edges define a corner portion at a joint of the two adjacent side edges, and at least one of the antenna modules is arranged at or close to the corner portion; or at least one of the antenna modules is arranged at or close to the side edge.

19. The electronic device of claim 18, wherein the housing has four corner portions, and the first antenna module, the second antenna module, the third antenna module, and the fourth antenna module are arranged at or adjacent to the four corner portions, respectively.

20. The electronic device of claim 18, wherein the plurality of side edges comprise a first edge and a second edge adjacent to the first edge, a length of the first edge is greater than a length of the second edge, a radiator of a middle high band (MHB)+ultra high band (UHB) antenna element of the first antenna module is arranged at or adjacent to the first edge, a radiator of another MHB+UHB antenna element of the first antenna module is arranged at or adjacent to the second edge, a first portion of a radiator of a lower band (LB) antenna element of the first antenna module is arranged at or adjacent to the first edge, and a second portion of the radiator of the LB antenna element of the first antenna module is arranged at or adjacent to the second edge, wherein a length of the first portion is greater than, equal to, or less than a length of the second portion.

* * * * *